United States Patent [19]

Milke

[11] Patent Number: 4,851,746

[45] Date of Patent: Jul. 25, 1989

[54] SENSING APPARATUS FOR AUTOMATIC DOOR

[75] Inventor: David D. Milke, Dekalb, Ill.

[73] Assignee: Republic Industries, Inc., Chicago, Ill.

[21] Appl. No.: 38,839

[22] Filed: Apr. 15, 1987

[51] Int. Cl.⁴ ............................................. E05F 15/20
[52] U.S. Cl. ..................................... 318/467; 318/480
[58] Field of Search ..................... 318/480, 466, 467; 49/25, 26, 28, 31; 250/221; 340/545

[56] References Cited

U.S. PATENT DOCUMENTS

| | | | |
|---|---|---|---|
| Re. 30,719 | 8/1981 | Mills | 187/52 R |
| 2,801,844 | 8/1957 | Cook | 268/59 |
| 2,946,931 | 7/1960 | Durbin | 317/124 |
| 3,003,317 | 10/1961 | Schroeder et al. | 92/130 R |
| 3,031,546 | 4/1962 | Williams | 200/61.62 |
| 3,039,764 | 6/1962 | Heinsman et al. | 268/33 |
| 3,147,000 | 9/1964 | Pinckaers | 268/33 |
| 3,181,856 | 5/1965 | Dyben | 268/65 |
| 3,497,995 | 3/1970 | Forsberg | 49/25 |
| 3,534,499 | 10/1970 | Chaffee | 49/25 |
| 3,742,434 | 6/1973 | Leyde et al. | 340/1 R |
| 3,783,556 | 1/1974 | Cook | 49/25 |
| 3,816,745 | 6/1974 | Primm et al. | 250/221 |
| 3,852,592 | 12/1974 | Scoville et al. | 250/221 |
| 3,874,117 | 4/1975 | Boehm | 49/264 |
| 3,875,403 | 4/1975 | Svensson | 250/209 |
| 3,903,996 | 9/1975 | Berkovitz et al. | 187/52 |
| 4,029,176 | 6/1977 | Mills | 187/52 R |
| 4,051,365 | 9/1977 | Fukuyama et al. | 250/222 R |
| 4,272,921 | 6/1981 | Jorgensen | 49/30 |
| 4,274,226 | 6/1981 | Evans | 49/25 |
| 4,306,147 | 12/1981 | Fukuyama et al. | 250/221 |
| 4,467,251 | 8/1984 | Jonsson | 318/480 |
| 4,514,625 | 4/1985 | Heiland | 250/221 |
| 4,560,912 | 12/1985 | Jonsson | 318/480 |
| 4,565,029 | 1/1986 | Kornbrekke et al. | 49/25 |
| 4,577,437 | 3/1986 | Gionet et al. | 49/25 |
| 4,581,526 | 4/1986 | Brattgard | 250/221 |
| 4,590,410 | 5/1986 | Jonsson | 318/480 |
| 4,614,057 | 9/1986 | Sorber | 49/29 |
| 4,621,452 | 11/1986 | Deeg | 49/28 |
| 4,669,218 | 6/1987 | Kornbrekke et al. | 49/25 |
| 4,697,333 | 10/1987 | Hagiwara | 49/25 |
| 4,698,937 | 10/1987 | Kornbrekke et al. | 49/25 |
| 4,706,227 | 11/1987 | DuVall et al. | 367/96 |
| 4,713,545 | 12/1987 | Norrgren et al. | 250/338 |
| 4,717,820 | 1/1988 | Jonnson et al. | 250/209 |
| 4,868,000 | 2/1975 | Spear et al. | 187/52 |

OTHER PUBLICATIONS

Sonarray Elevator Door Safety Edge, DBS Systems, Inc.
Besam VisionPulse Installation Manual.
Multiscan Optical-Electrical Automatic Door Control Installation Instructions and Service Guide, Kawneer Company, Inc.
Multiscan/Swingmatic-HC Hook-Up & Service.
BEA B013 Infrared Security Barrier Data Sheet.
BEA VG017 Motion Detector Data Sheet.
BEA VGO47 Microwave Radar Sensor Data Sheet.
Stanley Sentrex "Now You See It... Now You Don't" Advertising Literature.
Specifications for Stanley Sentrex Swing Door Sensor.
Stanley Captures the Magic of Technology.
Dor-O-Matic Controls-Jul 14, 1985.
Astro-Scan Motion Detection and Holding Beam System.
Dor-O-Matic 1987 Catalog.
Dorma Automatic News '86.
Gyro Tech Optics 4000 Pedestrian-Sensing System.
Gyro Tech Whole New World In Automated Entrance Systems.
Dor-O-Matic Invisible Dor-Man.
Dor-O-Matic Toe Gard.

*Primary Examiner*—Bentsu Ro
*Attorney, Agent, or Firm*—Willian Brinks Olds Hofer Gilson & Lione Ltd.

[57] ABSTRACT

A sensing apparatus for use with an automatic door operator and operator control logic responsive to door control signals for controlling the opening and closing operations of a swinging door is disclosed. The disclosed apparatus includes a plurality of infrared emitters and corresponding detectors on each side of the door which are recessed in the muntin of the door and which direct radiant energy and sense reflected radiant energy in selected detection zones which are determined at various positions of the door. Control logic connected to the detectors generates appropriate door control signals. The control logic is also responsive to door position signals generated by operator control logic to automatically vary the emission and detection levels of the emitters and detectors as the door opens and closes.

10 Claims, 13 Drawing Sheets

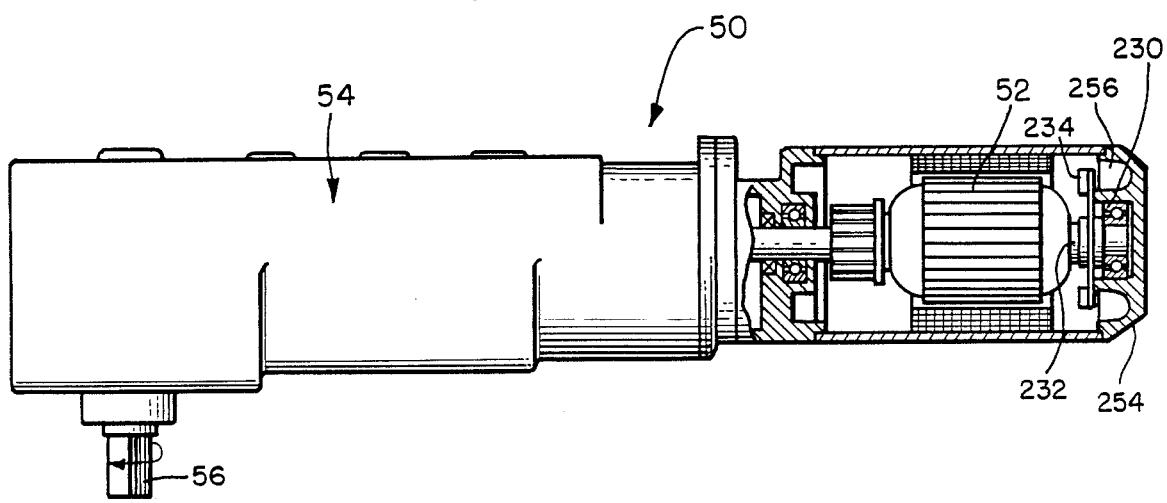
FIG. 5
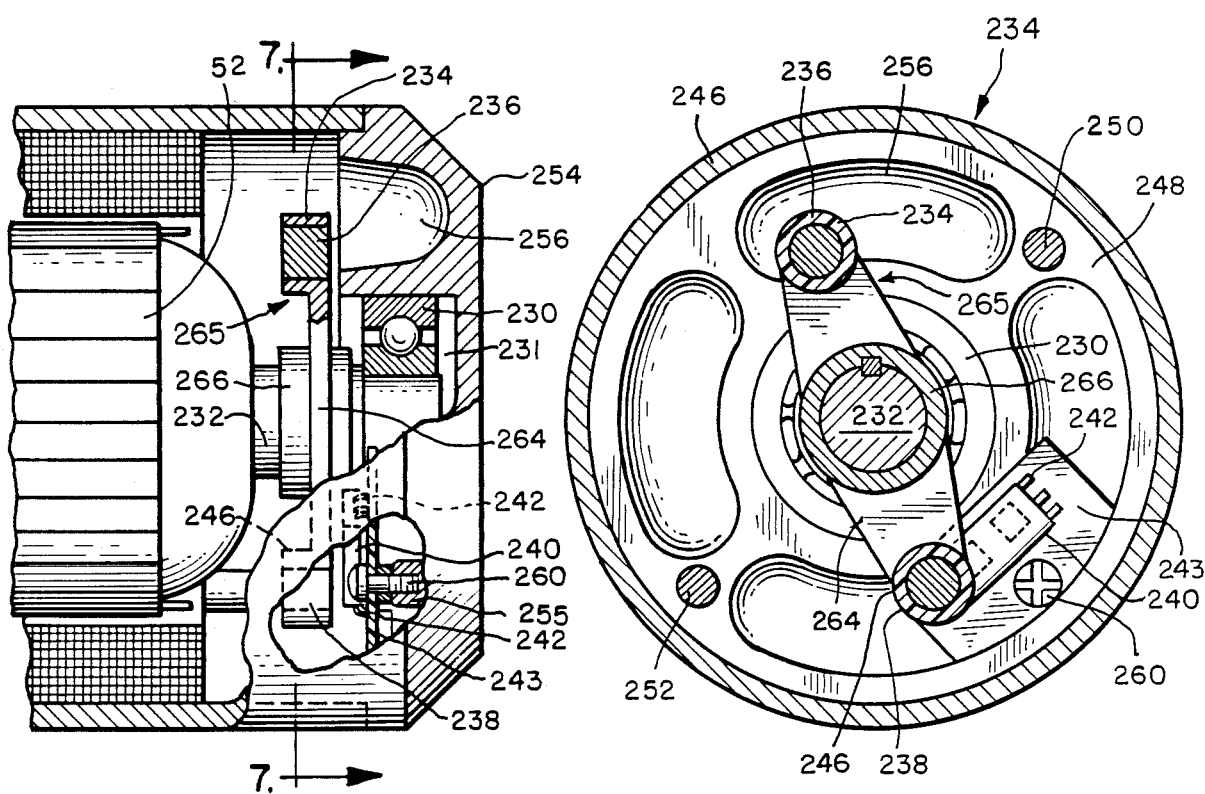
FIG. 6
FIG. 7

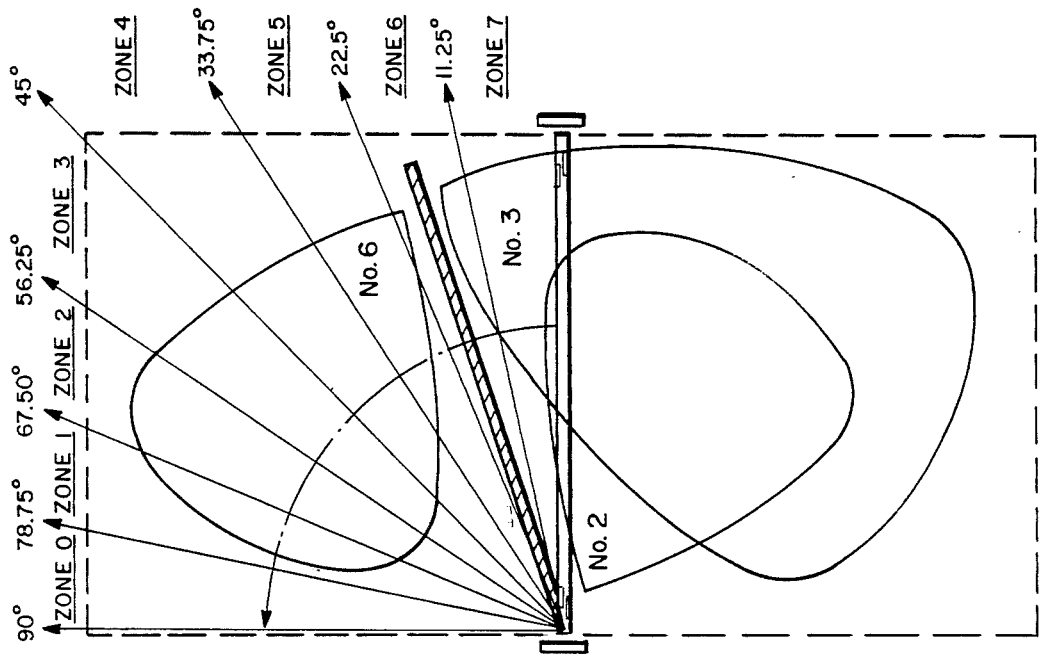
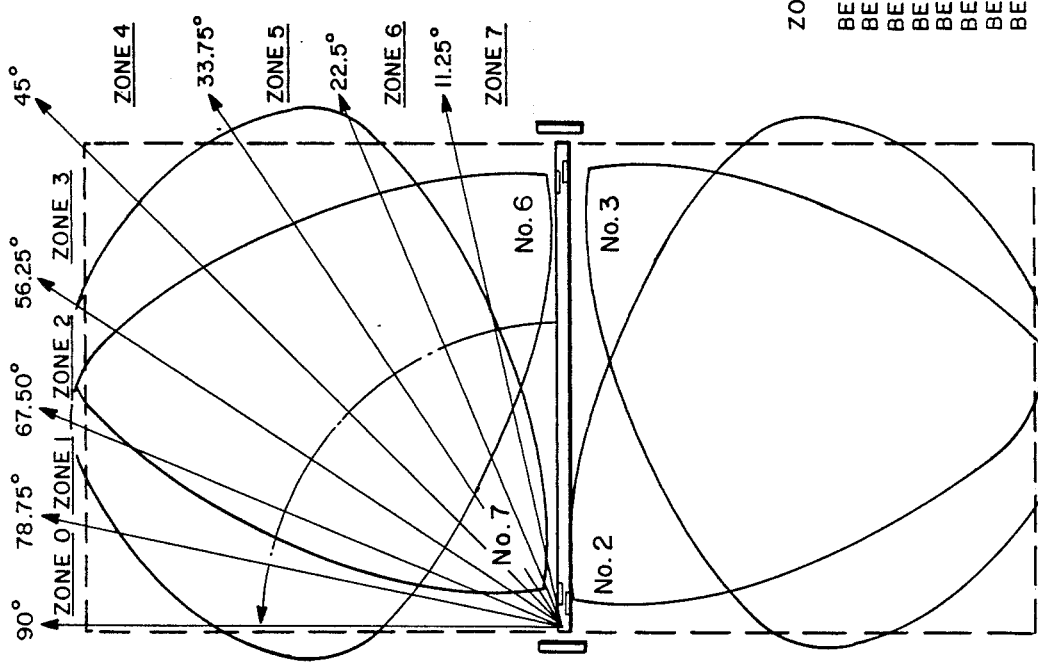
FIG. 8b
FIG. 8a

ZONE = 2
BEAM 1 = ON
BEAM 2 = LOW
BEAM 3 = LOW
BEAM 4 = OFF
BEAM 5 = ON
BEAM 6 = OFF
BEAM 7 = OFF
BEAM 8 = OFF

ZONE = 3
BEAM 1 = ON
BEAM 2 = LOW
BEAM 3 = LOW
BEAM 4 = OFF
BEAM 5 = ON
BEAM 6 = OFF
BEAM 7 = OFF
BEAM 8 = OFF

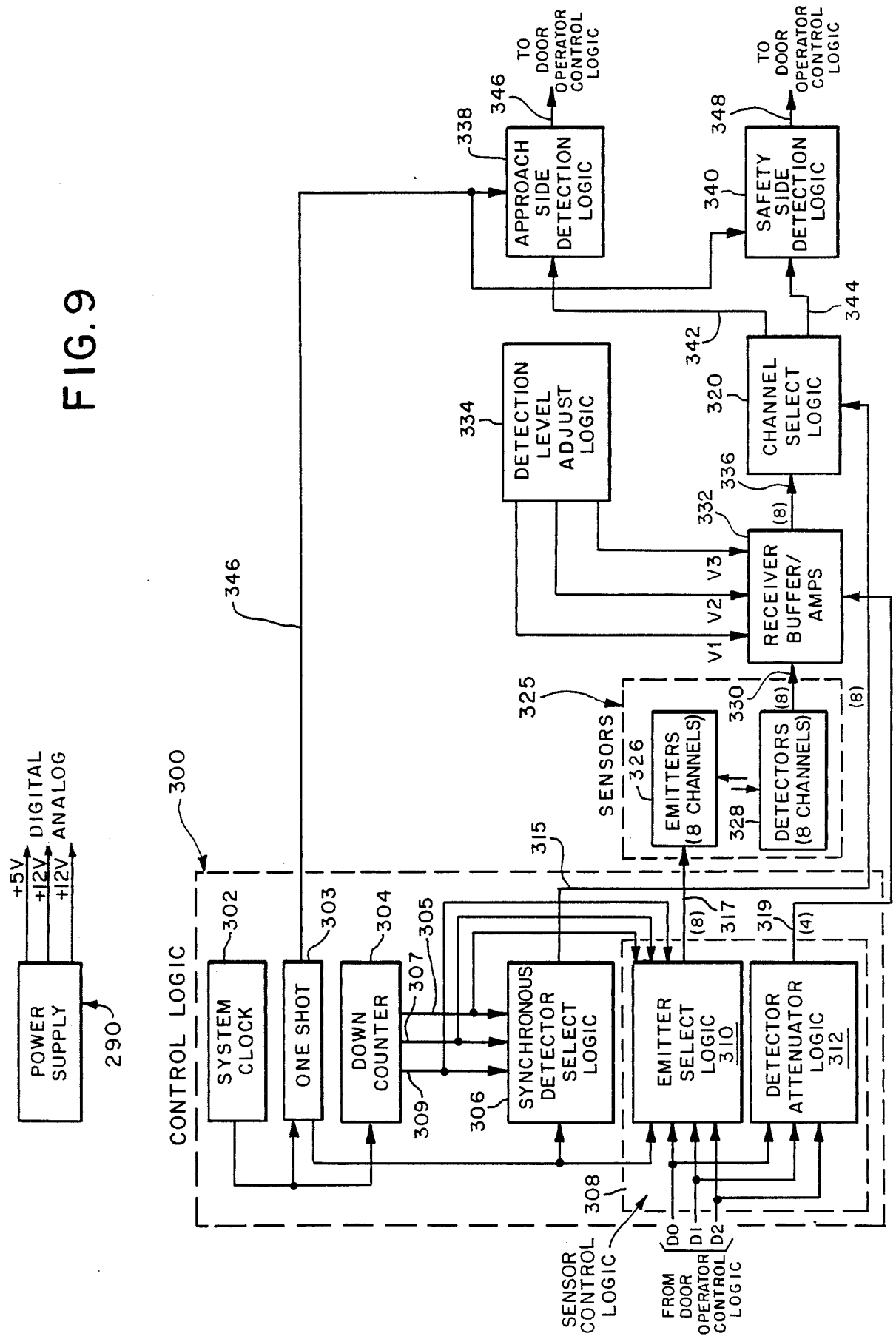

SENSING APPARATUS FOR AUTOMATIC DOOR

BACKGROUND OF THE INVENTION

1. Field of the Invention

This invention relates generally to automatic door actuator systems for swinging doors and more specifically to a retroflective presence sensing apparatus for such systems wherein the presence sensing apparatus is recessed within the muntin of a swinging door and is operable to detect the presence of objects in proximity to the door and generate signals to an automatic door operator to control the opening and closing of the door accordingly.

2. Description of the Related Art

Automatic door actuator systems are advantageously utilized in entry and exit ways having pedestrian traffic. Such systems are also often used to advantage where pedestrians entering or exiting a building or facility may be expected to be carrying or otherwise transporting a load which would prevent them from conveniently operating a manual door. Such situations are commonly found at shopping centers, supermarkets, and the like. Such systems are also advantageously used where it is simply desired to provide added convenience to a pedestrian entering or exiting a building, or where it may be expected that the pedestrian may, for some reason, be physically unable to manually open or close a door.

Typically, an automatic door actuator system includes sensors for detecting the presence of persons or objects within selected areas on both sides of the door, and a mechanical operator which is responsive to signals from the sensors to open and close the door. The door itself is typically of the swinging variety. Schroeder U.S. Pat. No. 3,003,317 discloses a wellknown type of swinging door actuator system that utilizes pressure-sensitive mat switches located under mats on the entrance (or approach) and exit (or safety) sides of the door, and a motor driven hydraulic door operator which is responsive to signals from the mat switches. In this system, the mat switches generate control signals in response to pressure from persons or objects to cause the operator to automatically open and close the door.

Despite the basic functionality of this system, it is subject to certain drawbacks. For example, the mats used in such systems can become worn or inoperative with use, thereby necessitating periodic repair or replacement. Moreover, worn mats may prevent the accurate generation of appropriate control signals. The mats of such systems also have a certain elevation with respect to ground level which may cause pedestrians to trip and which present an undesirable obstacle to wheeled vehicles such as grocery carts and wheel chairs, for example. Additional effort is often required to push such wheeled vehicles over the edges of such mats and there is a possibility that the edges of such mats could cause the upending of such wheeled vehicles.

Another type of known actuator system for a swinging door utilizes microwave motion detectors mounted on the approach and safety sides of the door. The detectors establish detection zones on both sides of the door. When a detector detects motion in its detection zone, it generates control signals that cause an operator to open or close the door.

This type of actuator system is also subject to certain limitations. For instance, the sensors of this system respond only to detected motion. Therefore, a person present but not moving in a detection zone may not be detected.

Another type of known actuator system for a swinging door is described in Kornbrekke U.S. Pat. No. 4,565,029, and Jonsson U.S. Pat. Nos. 4,590,410; 4,560,912; and 4,467,251. This type of system utilizes infrared emitters (LED's) and detectors (photodiodes) as sensors, and motors as operators. An operator control which is responsive to signals from the sensors to control the door operator is also provided.

Kornbrekke discloses a system in which a plurality of emitters and detectors are mounted externally on opposite vertical jambs on both sides of the door. The emitters establish detection zones on both sides of the door. A person or object in a detection zone reflects infrared radiation from an emitter and the reflected radiation is detected by the corresponding detector. The detectors generate signals which cause the operator to open and close the door. The Kornbrekke operator includes an optical encoder mounted on the armature of the motor which generates pulses indicative of discrete positions of the door. The door position signals are used to enable and disable selected emitters as the door opens and closes to prevent improper detection of the door itself.

The Jonsson patents disclose a system in which a plurality of emitters and detectors are externally mounted linearly in a horizontal plane on both sides of a swinging door. The emitters generate diverging beams of diffuse (rather than focused) radiation and the detectors detect the presence of persons and objects and generate door control signals to which a door operator control is responsive to cause a door operator to open or close the door. In the Jonsson actuator system, a door position switch is provided that is actuated by the door operator or the door itself when the door has opened to a selected angle. After the position switch is actuated, the sensitivity of the detectors are reduced to prevent improper detection of the door itself.

Both the Kornbrekke and Jonsson systems have certain limitations and drawbacks which restrict their usefulness and effectiveness. For instance, in order to provide adequate detection zone coverage both systems require placement of the sensors on external areas of the door or jambs in locations where they are exposed to contact with pedestrians as well as wheeled vehicles such as shopping carts and wheel chairs. Thus, the sensors of these systems are constantly exposed to damage during operation. Also, both systems are too rigid in the approach taken for preventing detection of the door itself or other surroundings. In the Kornbrekke system, only emitters are selectively enabled and disabled. In the Jonsson system, the sensitivity level of all detectors is reduced when the door exceeds a selected open position. In addition, the infrared sensors of such systems may have difficulty detecting some objects such as shopping carts approaching or near the door.

SUMMARY OF THE INVENTION

It is a feature of the present invention to provide a sensing apparatus for an automatic swinging door actuator system which is recessed within a muntin of the door, thereby providing both a pleasing appearance and protection against damage to the sensing apparatus. The sensing apparatus of the invention advantageously overcomes various drawbacks and limitations identified with respect to prior art systems. It is another feature of the present invention to provide such sensing apparatus having a plurality of emitters and detectors on each side of the door for respectively generating directed radiant energy and sensing reflected radiant energy. The emitters and detectors are individually controlled in response to door position signals provided by an operator to flexibly vary a plurality of approach-side and safety-side detection zones as a function of the door position, thus providing the advantage of improved detection and safety. It is still another feature of the invention to provide such sensing apparatus having supplemental motion detector means in order to advantageously provide even more accurate and reliable detection and increased safety.

These and other objects, features and attendant advantages of the invention can be obtained by providing a sensing apparatus for use with an automatic door operator which is responsive to door control signals to effect opening and closing of a swinging door which has a door frame including a horizontal muntin. The sensing apparatus includes means for providing door position signals representative of the instantaneous position of the door, a plurality of radiant energy emitters on each side of the door which generate a plurality of directed beams of radiant energy to define a plurality of directed sensing zones, and a plurality of directed detectors on each side of the door associated with said emitters and being operative to generate detection signals indicative of the presence of retroflective objects such as persons in the sensing zones when the reflected radiant energy exceeds a predetermined detection level. The emitters and detectors are recessed within the muntin of the door. The sensing apparatus also includes sensor control means which responds to the door position signals and which operates to control the energization of the emitters at predetermined door positions, and circuitry responsive to the detection signals to generate door control signals.

In one aspect of the invention, the sensor control means also controls the detection level of selected detectors in response to the door position signals. In another aspect, the sensing apparatus includes a supplemental motion detector which generates motion detection signals when motion is detected within a predetermined motion detection zone.

BRIEF DESCRIPTION OF THE DRAWINGS

The features which are believed to characterize the invention are set forth in the appended claims. The invention itself together with its objects, features, and attendant advantages will be best understood by reference to the following detailed description which, when taken in conjunction with the accompanying drawings, discloses a presently preferred embodiment of the invention.

FIG. 5 is a partially exposed front elevation view of an automatic swinging door operator preferred for use with the sensing apparatus of the invention, including apparatus for generating signals indicative of door position;

FIG. 6 is a partially exposed, enlarged side elevation view of the operator shown in FIG. 5 illustrating the details of the apparatus for generating signals indicative of door position;

FIG. 7 is a front elevation view of the apparatus for generating signals indicative of door position shown in FIG. 6, taken along a line 7—7;

FIGS. 8a–8h inclusive are diagrammatic illustrations of the approach-side and safety-side detection zones established by the sensors of the preferred sensing apparatus as the door swings through a 90° arc;

FIG. 9 is a block diagram illustrating generally the electronic elements of the preferred sensing apparatus embodying the invention;

DETAILED DESCRIPTION OF THE PRESENTLY PREFERRED EMBODIMENT

Figure 1:
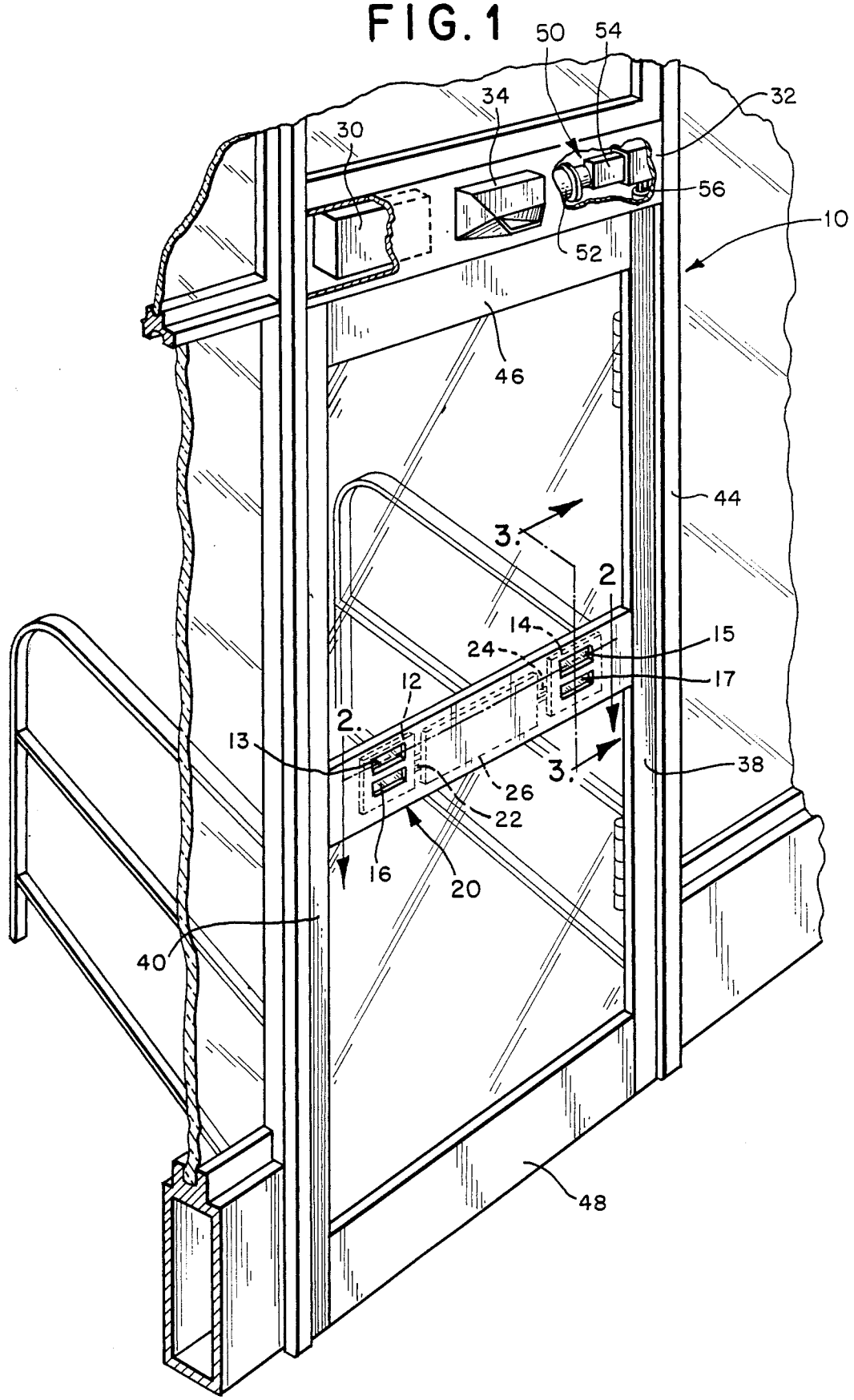
FIG. 1 is a fragmented front perspective view of a typical swinging door including a preferred embodiment of the sensing apparatus of the invention mounted thereon.

Referring to the drawings, FIG. 1 illustrates generally a preferred embodiment of the sensing apparatus of the invention mounted to a swinging door 10 which has a frame comprised of vertical stiles 38 and 40, horizontal top and bottom pieces 46 and 48, and a hollow, horizontal muntin 20 which is fastened between the stiles 38 and 40 by any suitable means. The components comprising the sensors of the preferred sensing apparatus, which are described in detail below, are mounted on horizontally spaced printed circuit boards 12 and 14 recessed within the muntin 20. Input and output terminals of the printed circuit boards 12 and 14 are connected by conventional electrical connector means such as ribbon connectors 22 and 24 to a printed circuit board 26 which is also mounted within the muntin 20 in the central region thereof and which contains signal processing and control logic components of the sensing apparatus which are described in detail below. Input and output terminals of the printed circuit board 26 are connected to corresponding input and output terminals of a door operator control box 30 by conventional electrical connectors such as a multi-wire cable and AMP connectors which for convenience are not shown. As an example, however, a multi-wire cable can be fed from the circuit board 26 through a hollow section of the stile 38, threaded through a hole (not shown) in the front of the stile 38, threaded through a second corresponding hole (not shown) in the front of a vertical jamb 44 of the door by a conventional protective flexible link (not shown), and fed through a hollow section of the jamb 44 to the door operator control box 30.

The door operator control box 30 is mounted in a hollow header area 32 immediately above the door 10 and contains conventional door operator control logic (not shown). The door operator control logic has input and output terminals connected to a door operator 50 by conventional electrical cable and connectors (not shown) and is operative to transmit operator control signals and to receive signals indicative of changes in the position of the door 10. The door operator control logic also has input and output terminals connected to the sensing apparatus through the terminals of the circuit board 26 and is operative to receive detection signals therefrom and transmit door position signals thereto. The control box 30, including the operator control logic, is suitably a microcomputer control unit part No. 81540-900 which is manufactured and sold by the Dor-0-Matic Division of Republic Industries, Inc. of Chicago, Ill.

The door operator 50 is also mounted in the header 32 and suitably comprises a conventional motor 52, gear box 54, and drive shaft 56 which are interconnected to each other and connected to the door 10 in a conventional manner known to those skilled in the art. The operator 50 is suitably a motor and gear box part No. 81002-901 (right hand open) or 81002-902 (left hand open) manufactured by the Dor-0-Matic Division of Republic Industries, Inc. of Chicago, Ill. in which the motor 52 has been slightly modified to provide signals indicative of changes in the position of the door 10 for use by the door operator control logic in generating door position signals. The modifications are described in detail below.

In the preferred embodiment, a motion detector 34 is mounted externally to the header 32 by any suitable fastening means. FIG. 1 illustrates a motion detector 34 mounted to the approach side of the header 32. The motion detector 34 acts as a supplemental sensor to the sensors mounted in the muntin 20. The motion detector 34 has an output connected to an input of the operator control box 30 by means of a conventional electrical connector (not shown) and provides door control signals to the operator control logic when it detects motion in proximity to the door 10 to control the opening and closing thereof. The motion detector 34 is suitably a conventional microwave-type detector such as the ASTROSCAN ™ motion detection and holding beam system which is available together with detailed installation and operation instructions from Dor-0-Matic Division of Republic Industries, Inc. of Chicago, Ill.

Figure 2:
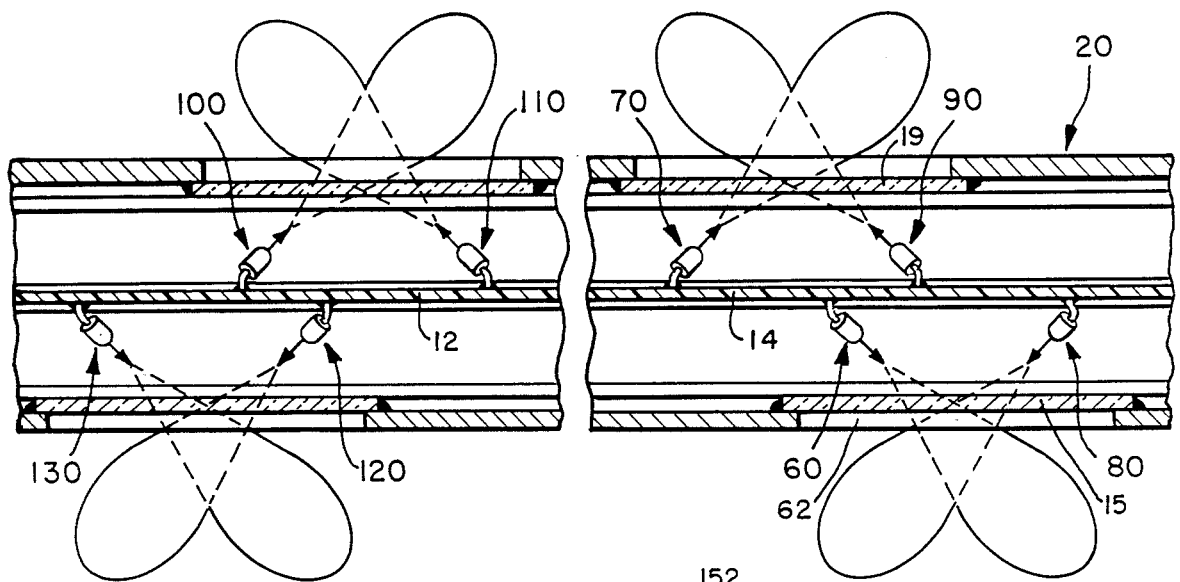
FIG. 2 is a fragmented exposed top plan view of the muntin of the door shown in FIG. 1 taken along a line 2—2 diagramatically illustrating the relative positions and orientations of the emitters comprising a portion of the sensors of the preferred sensing apparatus.
Figure 3:
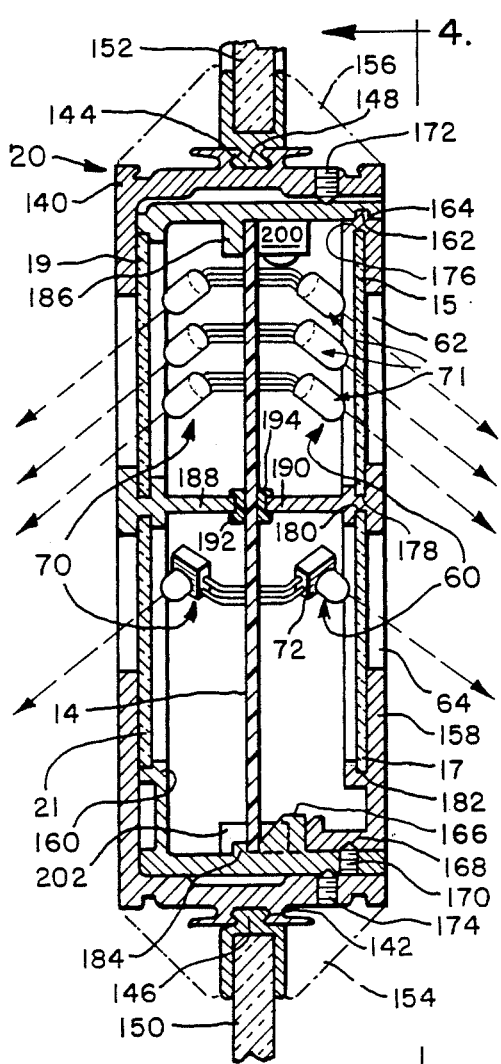
FIG. 3 is an exposed side elevation view of the muntin of the door shown in FIG. 1 taken along a line 3—3 illustrating the relative locations and orientations of the emitters and detectors comprising two representative sensors of the preferred sensing apparatus.
Figure 4:
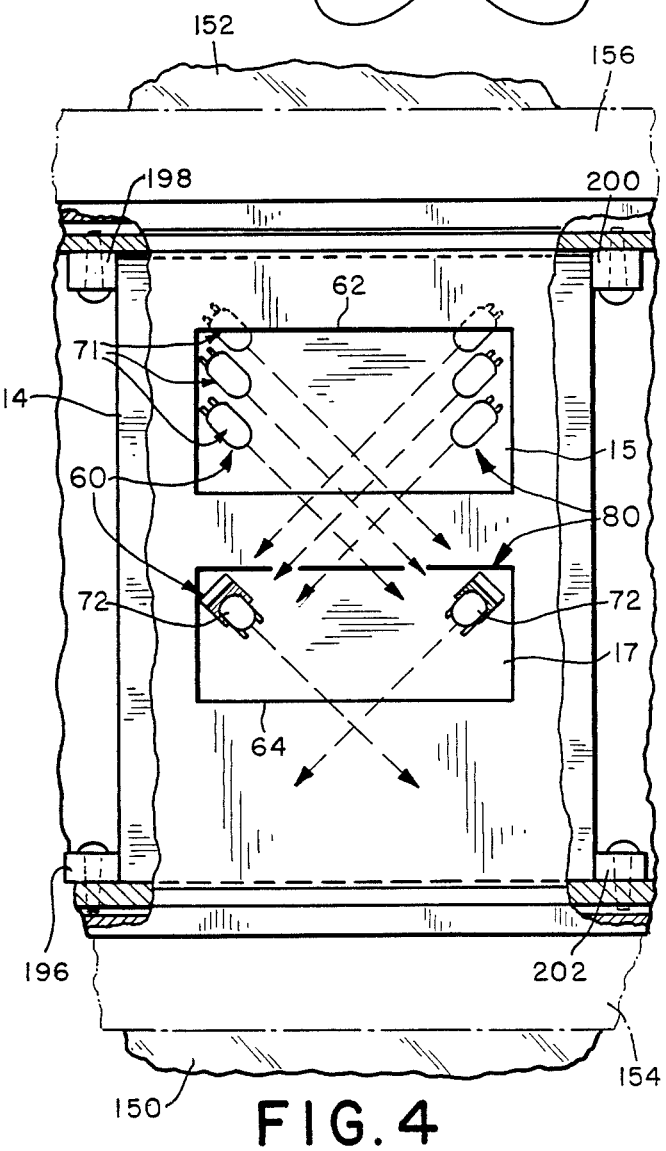
FIG. 4 is a partially exposed front elevation view of the muntin shown in FIG. 3 taken along a line 4—4 illustrating the relative locations and orientations of the emitters and detectors comprising two representative sensors of the preferred sensing apparatus as viewed through emitter and detector windows of the muntin.
Figure 8D:
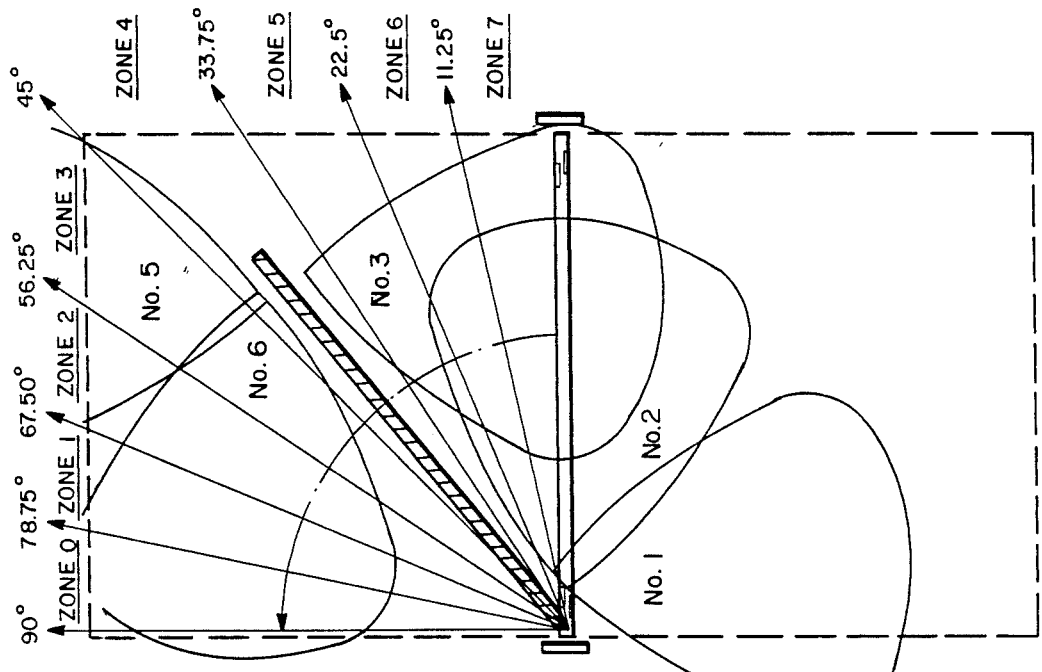
Figure 8C:
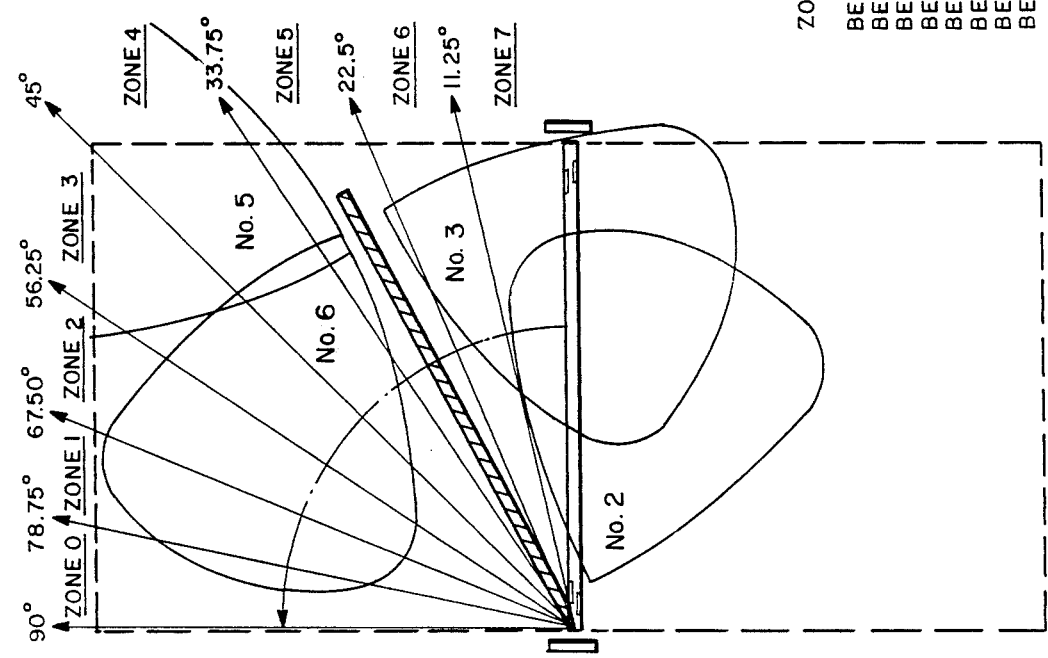
Figure 8F:
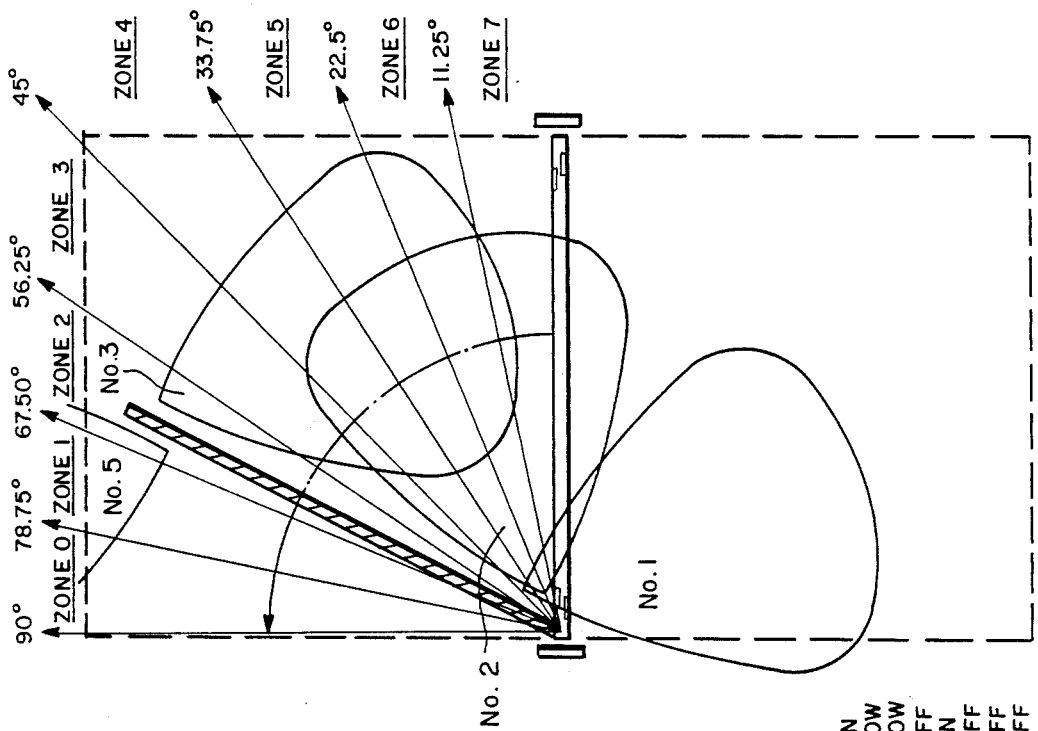
Figure 8E:
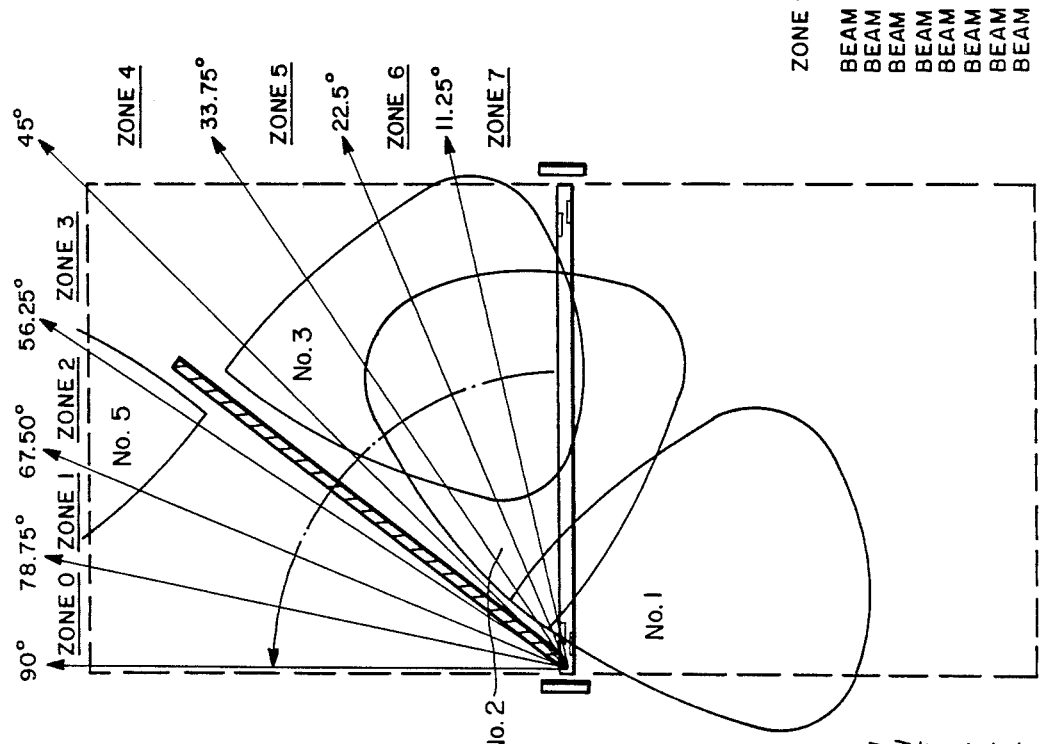
Figure 8H:
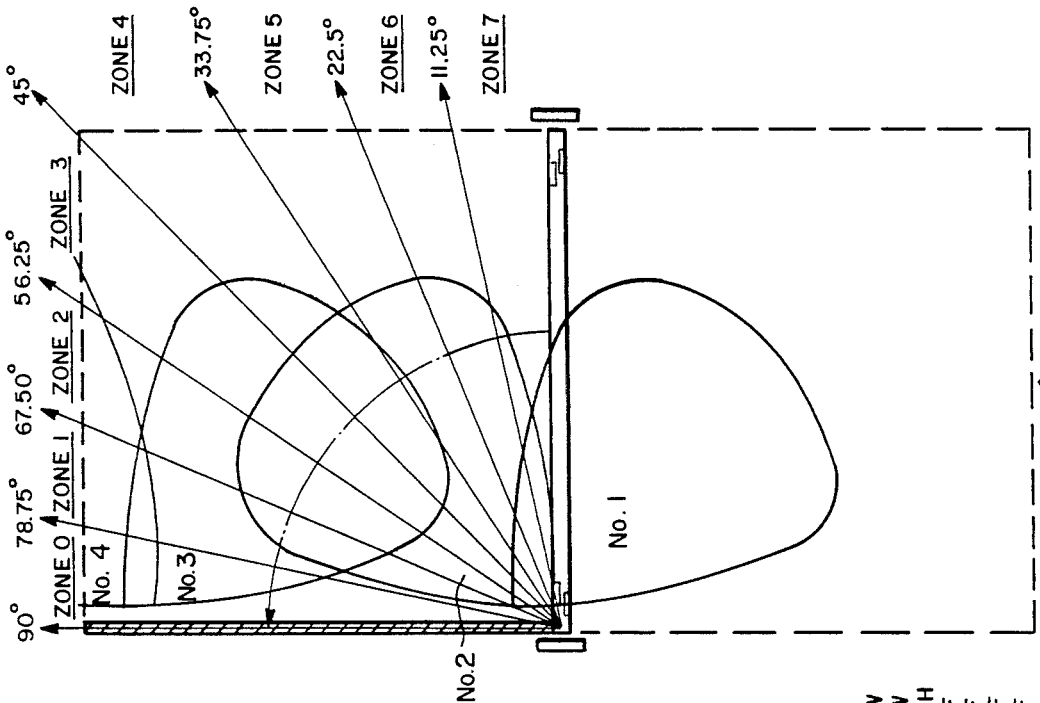
Figure 8G:
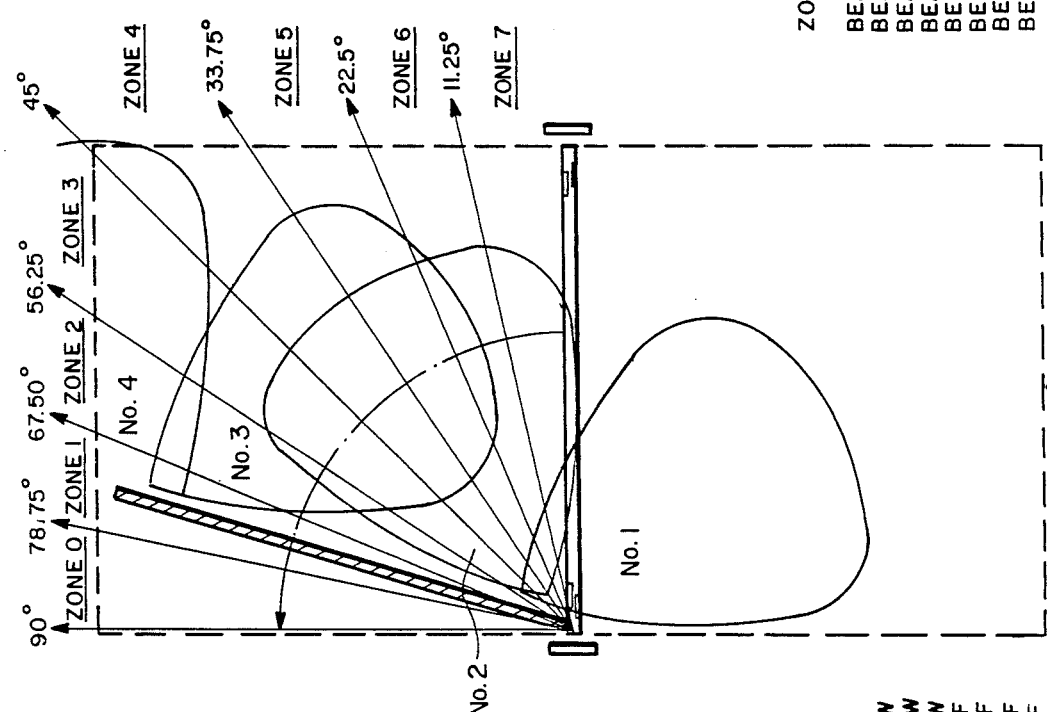

As shown in FIGS. 1–4, the horizontally spaced printed circuit boards 12 and 14 are mounted vertically within the muntin 20 in proximity to opposite longitudinal ends thereof. In the preferred embodiment, each circuit board 12 and 14 has mounted thereon four infrared retroflective sensors, two on each side. Circuit board 12 has sensors 100 and 110 mounted on the safety side and sensors 120 and 130 mounted on the approach side of the door 10. Circuit board 14 has sensors 70 and 90 mounted on the safety side and sensors 60 and 80 mounted on the approach side. Each sensor preferably comprises an emitter comprised of a group of three LED's and a corresponding detector comprised of a photodiode, LED's 71 and photodiode 72 of sensor 60 being identified as a representative emitter and detector. Each group of three LED's is mounted vertically one above the other as shown in FIGS. 3 and 4 with a corresponding photodiode being mounted below and in vertical alignment therewith. The locations of the sensors on each side of each circuit board 12 and 14 are preferably staggered as shown in FIG. 2 such that the outermost sensors 90 and 100 on the safety side of each board are positioned farther from the opposite longitudinal ends of the muntin 20 than are the outermost sensors 80 and 130 on the approach side of the boards.

Each LED is preferably aligned at an angle of approximately 45° from a plane transverse to the vertical plane of the printed circuit board on which it is mounted so that the emitter pair on each side of each printed circuit board generates two directed beams of radiant energy to define or establish a plurality of detection zones in directions from which objects or persons are expected to approach as illustrated diagramatically in FIG. 2. Also, each LED is preferably oriented at a downward angle of approximately 45° with respect to a horizontal plane transverse to the plane of the printed circuit board on which the LED is mounted. This orientation ensures that radiant energy beams generated by the emitters will limit the range at which persons and objects will be detected. Each photodiode is also preferably oriented with an inward and downward angle of approximately 45° as described above so that each detector is optimally oriented to receive maximum reflection of radiation from a retroflective person or object present within the directed beam generated by its corresponding emitter. Although inward and downward angles of 45° are presently preferred, these angles may be altered if desired to change the angle of incidence between the emitters and detectors or to vary the directions of detection zones.

The muntin 20 includes an emitter window for each pair of emitters and a detector window for each corresponding pair of detectors. Emitter windows 15 and 19 and detector windows 17 and 21 are illustrated as being representative. The emitter and detector windows preferably comprise conventional infrared filters which transmit radiant energy having wavelength in the near infrared region and which substantially block other wavelengths. Filters having infrared insertion losses as high as 2–3 db are suitable. In the preferred embodiment, the emitters are located approximately 0.050–0.100 of an inch from the faces of the infrared filters.

Each emitter and detector window is recessed within the muntin 20 and is exposed by an aperture in the muntin housing. Apertures 62 and 64 corresponding to emitter window 15 and detector window 17 respectively are identified as representatives. As best shown in FIG. 4, the emitters 71 are positioned relative to the edges of the aperture 62 such that the left and top edges block outward and upward dispersion of the emitted radiation and direct the detection beam in a generally downward and inward direction. The bottom edge of the aperture 62 restricts the downward dispersion of the beam. The same description applies equally to the remaining emitters and corresponding apertures. Like wise, the detector 72 is positioned relative to the edges of the aperture 64 such that the edges limit and define the angle of incidence of reflected radiation received by the detector 72. The detectors are located approximately the same distance from the outside edges of the apertures as the corresponding emitters in the preferred embodiment. The same description applies equally to the remaining detectors and corresponding apertures.

Referring particularly to FIGS. 3 and 4, the muntin 20 is preferably a hollow frame constructed of extruded aluminum or an equivalent light, sturdy, and durable material. As shown in FIG. 3, the frame is defined by a side piece 158, an inner shell 160, and an outer shell 140. The outer shell 140 defines the top, bottom, and left sides of the frame. The outer shell 140 has formed therein by machining or other suitable means emitter and detector apertures which are positioned with respect to each pair of emitters and detectors of the sensors as shown in FIGS. 2 and 4. The top and bottom of the outer shell 140 include elongate, glass-receiving tracks 142 and 144 respectively formed integrally therewith and adapted to receive correspondingly-shaped metal or other insulating strips 146 and 148 affixed to the edges of windows or door panels 150, 152 which are slid into the tracks 142, 144. Conventional weatherstrip material 154, 156 is suitably utilized to seal the sliding connections.

The side piece 158 defines the fourth side of the frame. The side piece 158 has machined or otherwise formed therein four apertures for two emitter and two detector pairs as shown in FIGS. 2 and 4. The side piece 158 also includes an elongate tab 162 which fits in a corresponding elongate slot 164 of the inner shell 160 to provide a sliding connection between the two pieces. The side piece 158 is held in proper vertical position by a stop block 166 integrally formed with the inner shell 160. A threaded opening is provided in the inner shell 160 and a corresponding notch 168 in the side piece 158 for receiving a setscrew 170 which holds the side piece 158 securely to the inner shell 160. The inner shell 160 and side piece 158 slides into the outer shell 140 as a unit. The outer shell 140 is provided with threaded openings at the top and bottom thereof through which set screws 172 and 174 are received to secure the inner shell 160 in place, thus securing the side piece 158 in position also. If desired, the center section of the side piece 158 between the apertures may be cut out and removably attached to the inner shell 160 by screws or other fastening means to provide access to the interior of the muntin 20 without the necessity for disassembling the entire frame.

Both the side piece 158 and inner shell 160 have formed therein elongate window tracks, representative tracks 176, 178, 180, and 182 being identified, into which the emitter and detector windows, windows 15 and 17 for example, are slid and positioned as shown in FIG. 2 with respect to the corresponding apertures such as apertures 62 and 64. The windows are mounted as described in the inner shell before it is mounted in the outer shell 140. The circuit boards 12 and 14 are likewise mounted vertically in the inner shell before it is mounted in the outer shell 140. The internal piece 160 has formed integrally therewith verticallyaligned upper and lower circuit board retaining tabs 186 and 184 for holding the circuit boards 12 and 14 in vertical alignment. The lower retaining tab 184 together with the stop block 166 forms a narrow channel into which the bottom edges of the circuit boards 12 and 14 slide. Circuit board stop blocks, of which blocks 196, 198, 200, and 202 are representative, are adhered or otherwise connected, preferably removably, to the inside top and bottom surfaces of the inner shell 160 to prevent movement of the circuit boards 12 and 14 in a longitudinal direction from the position illustrated in FIG. 4 with respect to the emitter and detector apertures. As an equally preferred alternative, the circuit boards and retaining tabs 184 and 186 can be drilled and screwed together.

The side piece 158 and inner shell 160 each have a co-planar horizontal isolation wall 190 and 188 respectively integrally formed therewith. The isolation walls 190 and 188 are dimensioned so that when the side piece 158 is fastened to the inner shell 160, a circuit board receiving gap is formed therebetween. The end of each isolation wall 188 and 190 preferably has a shock absorbing material 192, 194 such as foam rubber adhered thereto by any suitable means. The foam rubber holds the boards 12 and 14 in place and absorbs forces which might otherwise be transmitted thereto. In addition, the isolation walls 180 and 188 and foam rubber 192 and 194 form an optical isolation barrier between the emitters and detectors of the sensors to prevent direct transmission of light between the two.

FIGS. 5 through 7 illustrate in greater detail the preferred door opeator 50 described above and the modifications made thereto to provide signals indicative of changes in door position. As described above, the operator 50 generally comprises an electric motor 52, gear box 54, and drive shaft 56. In the preferred embodiment, the motor 52 is modified by providing a cast motor housing cap 254 which is attached to the end of the motor housing opposite the gear box 54 end by conventional threaded bolts 250, 252. The cap 254 is cast with a central circular cavity 231 in which is mounted a ball bearing ring 230. The ball bearing ring 230 receives an armature extension 232 of the motor 52 and allows it to rotate freely. The cap 254 is also formed with a plurality of pseudo-elliptical cavities formed in a circular arrangement around the circumference thereof, cavity 256 being identified as representative. One of the solid areas 255 between cavities is provided with a threaded well for receiving a screw. This solid area 255 may be machined down or cast such that it does not extend outwardly as far as the other solid areas between cavities for a reason which will become apparent. A circuit board 243 containing a conventional Hall-effect device 240 having leads 242 soldered or otherwise attached thereto is attached flat to the solid area 255 by a screw 260. In the preferred embodiment, the Hall-effect device 240 comprises a pair of Hall-effect transistors packaged in a dual integrated circuit. A magnet mounting arm 265, which is suitably of a molded plastic is mounted on the armature extension 232 for rotation therewith. The arm 265 comprises a substantially elongate body 264 having circular magnet receiving rings 234 and 246 formed integrally therewith at opposite ends thereof. The arm 265 also has a central circular opening bounded by a mounting ring 266 for mounting onto the armature extension 232. The circular opening preferably has a circumference that provides a secure press fit between the mounting ring 266 and armature extension 232. Slots and snap rings (not shown) may also be used to hold the arm 265 in place, if desired. Commercially available ring or disk-shaped permanent magnets 236 and 238 are mounted with a press or friction connection in the respective magnet receiving rings 234 and 246.

In operation, when the motor 52 is activated to operate the door 10, the armature extension 232 rotates thereby causing the magnet mounting arm 265 to rotate. The body 264 of arm 265 has a longitudinal dimension such that as the magnets 236 and 238 rotate with the arm 265, they sequentially pass directly over the Hall-effect device 240 thereby causing the Hall-effect transistors to become alternately conductive and non-conductive and to generate pulses indicative of the change in door position which are conducted to the operator control logic in the control box 30. The operator control logic in the preferred control box 30 identified above includes a microprocessor that counts the signals generated by the Hall-effect device 240, converts the count value to an angular door position value, and generates from the angular value a 3-bit digital zone identification code which identifies the position of the door 10 and which it transmits to components of the sensing apparatus described in detail below.

FIGS. 8a-8h illustrate graphically the plurality of directed detection zones which the sensors 60, 70, 80, 90, 100, 110, 120, and 130 (each comprising an emitter 326 and detector 328) of the preferred sensing apparatus define or establish on the approach and safety sides of the door 10 as the door 10 opens and closes. Although in these figures the door 10 is illustrated as being a left hand open door, it is understood that the detection zones for a right hand open door would be simply a mirror image of those illustrated. In the preferred embodiment, the 90° arc through which the door 10 passes as it moves from a completely closed to a completely open position is divided into eight zones. Each zone corresponds to an arcuate area of approximately 11.25°. Thus, zone 7 is defined as the arcuate area between the zero degree or fully closed position of the door 10 and the position at which the door is open by approximately 11.25° with respect to its completely closed position. Zone six is defined as the arcuate area between the 11.25° open position of the door 10 and an open position of approximately 22.5°, and so on with zone zero being defined as the arcuate area between the 78.75° open position and the 90° or fully open position of the door 10. It is understood that many other zone definitions are also possible depending on the physical structure of the surroundings of the door 10 as well as the application in which automatic door control is being applied. Also, it is not necessary that the zones define equal arcuate areas as in the preferred embodiment.

To facilitate the following description, sensors 130, 120, 80, 60, 70, 90, 100, and 110 are referred to as sensors 1, 2, 3, 4, 5, 6, 7, and 8 respectively and the detection zones established thereby are labelled correspondingly. As the door 10 proceeds through the zones during an opening or closing cycle, the door control logic generates the 3 bit zone identification code as described above. In the preferred embodiment, the sensing apparatus includes sensor control logic which is described in detail below and which operates to individually selectively enable or disable each of the emitters of the sensors, and to individually selectively attenuate the sensitivity, i.e. increase the detection level, of each of the detectors of the sensors in order to vary the directions and ranges, i.e. the patterns, of the detection zones as the door 10 opens and closes. Because each of the emitters and detectors is individually controlled, the preferred sensing apparatus is able to provide accurate and complete detection coverage by a plurality of directed detection zones throughout the opening and closing cycles of the door 10.

As illustrated in FIG. 8a, when the sensor control logic receives a zone identification code indicating that the door 10 is in zone 7, it operates to enable the emitters of sensors 2 and 3 on the approach-side of the door and sensors 6 and 7 on the safety-side of the door while disabling the emitters of the remaining sensors. In the preferred embodiment, the sensor control logic does not attenuate the sensitivity of the detectors of any of the sensors when the door is in zone 7. As a result, the sensors 2, 3, 6, and 7 generate a pattern of detection zones 2, 3, 6, and 7 on the approach and safety sides of the door 10 as illustrated in FIG. 8a.

As the door 10 is opened by the door operator and proceeds from zone 7 into zone 6, the door operator control logic changes the zone identification code to indicate that the door is now in zone 6. The sensor control logic responds to the new code in the same manner as just described to generate the pattern of approach-side and safety-side detection zones illustrated in FIG. 8b. The sensor control logic generates the illustrated detection zones 2, 3, and 6 by enabling the emitters of sensors 2, 3, and 6, while disabling the emitters of the remaining sensors. In addition, the sensor control logic operates to attenuate the sensitivity, i.e. to raise the detection level, of the detectors of sensors 2 and 6, thus effectively reducing the range of the detection zones 2 and 6 generated by those sensors.

As the door 10 continues through its opening cycle, the door operator control logic continues to change the zone identification code, and the sensor control logic continues to control the energization of the emitters and the detection levels of the detectors of the sensors to vary the pattern of detection zones on the approach and safety sides of the door 10 as lustrated in FIGS. 8c-8h inclusive. After the door reaches its fully opened position, the door operator control logic causes it to remain in that position for a predetermined period of time. If during that period of time no persons or objects are sensed in any of the then-active detection zones, the door enters a closing cycle wherein it proceeds back through the zones from its fully open position in zone 0 to its fully closed position in zone 7. During the closing cycle of the door 10, the door operator control logic changes the zone identification code and the sensor control logic controls the emitters and detectors of the sensors exactly as described above and as illustrated in FIGs. 8a-8h, except in a reverse sequence. It should be apparent from the foregoing description that the sensor control logic automatically controls each detection zone individually and selectively as the door position changes thus avoiding the inadvertent detection of objects such as walls door jambs, or guide rails, while continuing to provide complete detection coverage of the approach and safety sides of the door 10.

FIG. 9 is a block diagram illustrating generally the electronic components of the preferred sensing apparatus which are mounted in the muntin 20 of the door 10 on circuit boards 12, 14, and 26. The electronics include control logic 300 which in turn is comprised of a system clock 302, a one shot 303, a down counter 304, synchronous detector select logic 306, and sensor control logic 308. Sensor control logic 308 in turn comprises emitter select logic 310 and detector attenuator logic 312. The output of the system clock 302 is connected to an input of the one shot 303 and the down counter 304, which in the preferred embodiment is a modulo-8 down counter. The one shot 303 outputs a narrow positive-going pulse at each rising edge of the clock signal output by the system clock 302. The output of the one shot 303 is connected to inputs of the synchronous detector select logic 306 and the emitter select logic 310. The down counter 304 decrements its count on each rising edge of the clock signal. The down counter 304 outputs a 3-bit binary coded decimal value representing the current count value from 7 to 0 on lines 305, 307, and 309. Line 305 corresponds to the least significant bit of the binary coded decimal value and line 309 corresponds to the most significant bit. The lines 305, 307, and 309 connect the outputs of the down counter 304 to inputs of the synchronous detector select logic 306 and the emitter select logic 310.

The synchronous detector select logic 306 has 8 output lines identified collectively as 315 which are connected to inputs of channel select logic 320. The synchronous detector select logic receives the count value from the down counter 304 and utilizes the count value to select one of the eight output lines 315 to conduct the inverted one-shot pulse to a corresponding input of the channel select logic 320 as an enable signal. As the counter value sequentially changes, the synchronous detector select logic sequentially selects each of the eight lines 315.

The emitter select logic 310 of the sensor control logic 308 also utilizes the count value from the down counter 304 to select one of eight output lines identified collectively as 317 to simultaneously conduct the one-shot pulse to the input of one of eight emitters 326 to sequentially energize each emitter 326. Thus, the emitter and corresponding detector of each sensor are synchronously and simultaneously energized and enabled respectively. In addition, the emitter select logic 310 receives as an input a 3-bit binary coded decimal zone identification code D0-D2 from the door operator control logic as described above. In the preferred embodiment, the emitter select logic 310 stores an 8-byte emitter energization map, each byte corresponding to one of the eight zones through which the door 10 passes in a closing or opening cycle. Each byte provides an enable/disable code for each emitter and is sequentially selected by a unique value of the zone identification code D0-D2 as the door 10 passes through the zones. The emitter select logic 310 thus provides means to automatically, selectively, and individually enable or disable the energization of each emitter 326 in a pre-programmed sequence as the door 10 passes through each zone.

The detector attenuator logic 312 also receives the 3-bit zone identification code D0-D2 as an input. In the preferred embodiment, the detector attenuator logic 312 stores a detector attenuation map comprising up to 8-bytes of data. Each byte corresponds to one of the eight zones through which the door 10 passes in a closing or opening cycle. Each byte includes a low/high detection level code for up to eight detectors and is sequentially selected by a unique value of the zone identification code D0-D2 as the door 10 passes through the zones. The detector attenuator logic 312 thus provides means to automatically, selectively, and individually control the sensitivity, i.e. the detection level, of each detector in a pre-programmed sequence as the door passes through each zone. Although the detector attenuator logic 312 has the capability to control the detection level of up to eight detectors 328, in the preferred embodiment only four of eight available output lines 319 of the detector attenuator logic 312 are selectively connected to inputs of four of the eight detectors 328 as described in detail below.

The eight sensors 60, 70, 80, 90, 100, 110, 120, and 130 of the preferred sensing apparatus are identified in FIG. 9 collectively as sensors 325. The eight emitters of the sensors 325 are identified collectively as emitters 326 and the eight corresponding detectors of the sensors 325 are identified collectively as detectors 328. Each of the eight detectors 328 has an output line, the eight output lines being identified collectively as 330. The detectors 328 generate detection signals on the output lines 330 in response to receiving light reflected by a retroflective person or object in a detection zone.

Each of the eight output lines 330 is connected to an input of one of eight corresponding receiver buffer amplifiers which are collectively identified as 332. The receiver buffer amplifiers 332 also receive as inputs an amplifier bias voltage V1 and comparator level-setting voltages V2 and V3, all of which are generated by detection level adjust logic 334. In the preferred embodiment, the voltage V2 is connected to inputs of the four receiver buffer amplifiers 332 that are connected to the four detectors 328 of the approach-side sensors 60, 80, 120, and 130 while the voltage V3 is connected to inputs of the four receiver buffer amplifiers 332 connected to the four detectors 328 of the safety-side sensors 70, 90, 100, and 110. The bias voltage V1 is connected to inputs of all of the receiver buffer amplifiers 332. The receiver buffer amplifiers 332 filter and amplify the detection signals generated by the detectors 328. In addition, the receiver buffer amplifiers 332 utilize the level-setting voltages V2 and V3 to establish detection levels for the approach-side and safety-side detectors 328 respectively. A receiver buffer amplifier 332 does not output a detection signal unless the detection signal generated by the corresponding detector 328 exceeds the detection level set for that detector.

The detection level adjust logic 334 provides means for manually setting the values of the voltages V2 and V3 in order to adjust the standard detection level set for the approach-side and safety-side respectively detectors 328 by the corresponding receiver buffer amplifiers 332. The detection level adjust logic 334 also provides automatic temperature compensation for the detection levels.

The receiver buffer amplifiers 332 have output lines identified collectively as output lines 336 connected to corresponding inputs of the channel select logic 320. As described above, the channel select logic 320 also receives a synchronous enable signal on one of eight lines 315 from the synchronous detector select logic 306 simultaneously with the energization of each emitter. The channel select logic 320 utilizes the enable signal to simultaneously enable the detector/ amplifier channel corresponding to the energized emitter to transmit a detection signal to the approach side or safety side detection logic 338 or 340 if a retroflective person or object is detected. As each emitter is synchronously and sequentially energized, the synchronous detector select logic 306 sequentially selects each of the output lines 315, and the channel select logic 320 synchronously and sequentially enables the corresponding detector/amplifier channel, all simultaneously. The channel select logic 320 outputs any detection signal that may occur on the enabled detector/amplifier channel on a line 342 to the approach side detection logic 338 if the selected channel corresponds to an approach-side sensor or on a line 344 to the safety-side detection logic 340 if the selected channel corresponds to a safety-side sensor.

The approach side and safety side detection logic 338 and 340, respectively, are identical in structure and operation. Both are operative to process detection signals, if any, from the enabled channel, determine whether a detection is valid, and output a signal indicating a valid detection. The approach side and safety side detection logic 338 and 340 are enabled by the pulses output by the one shot 303 on a line 346 simultaneously with the energization of each emitter and the enablement of the corresponding detector/amplifier channel. At all other times, the approach side and safety side detection logic 338 and 340 are disabled, thus ensuring that any output by the approach side or safety side detection logic 338 or 340 is a result of the reflection of radiant energy emitted by an emitter 326 and detected by the corresponding detector/amplifier channel rather than a result of ambient radiation or other spurious causes. In addition, the approach side and safety side detection logic 338 and 340 require that a minimum number of detection pulses occur on an enabled channel during a predetermined time period before a valid detection output signal will be generated. In the preferred embodiment, the approach side and safety side detection logic 338 and 340 require that approximately ten successive detection pulses be received within a period approximately equal to ten cycles of pulsing each of the eight emitters in order to generate an output signal indicating a valid detection. Lines 346 and 348 connect the outputs of the approach side and safety side detection logic 338 and 340, respectively, to inputs of the door operator control logic which controls the opening and closing of the door 10 in response to the valid detection signals.

The electronic components of the sensing apparatus are supplied with operating voltage and logic reference voltage levels by a D.C. power supply 290.

The power supply 290 derives a +5 V, and two +12 V levels from the standard 110 V 60 Hz AC power waveform. One +12 V level is provided for the digital elements of the electronics and the other is provided for the analog elements.

Figure 10:
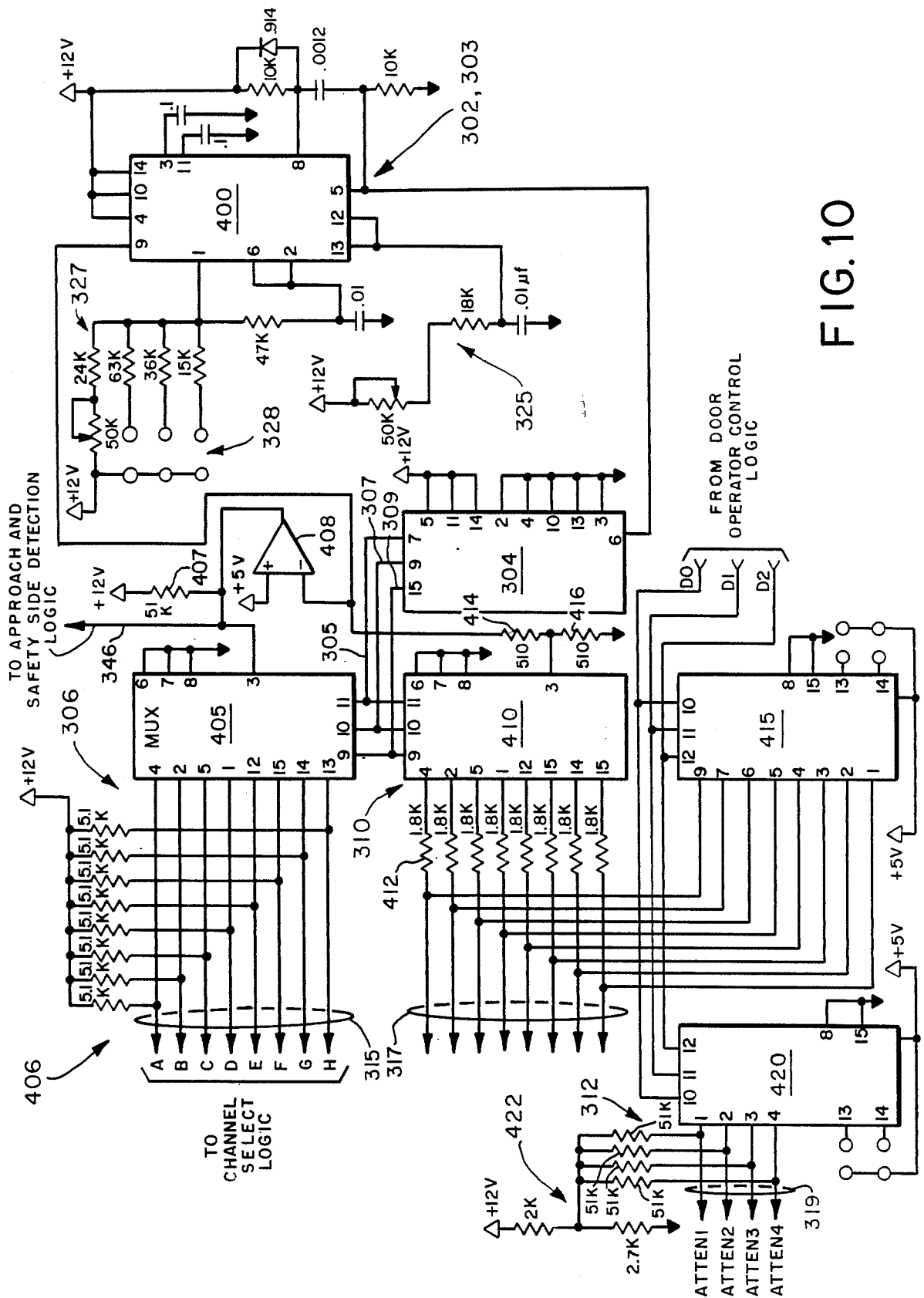
FIG. 10 is a schematic diagram illustrating the details of the control logic element of FIG. 9.

The details of the components described generally above will now be described. In the following description, the preferred values of components are as illustrated. FIG. 10 is a schematic diagram illustrating the details of the control logic 300. In the preferred embodiment, the system clock 302 and one shot 303 are provided by a dual multivibrator integrated circuit (IC) 400. One of the multivibrator circuits is configured as a free running oscillator (the clock), and the other as a one shot. The IC 400 is suitably an LM556 dual multivibrator IC manufactured by Motorola. The IC 400, when configured as illustrated, generates a 1 kilohertz clock signal at output pin 5. The clock signal is fed back as a trigger signal to the one shot portion of the circuit to trigger a positive-going one shot pulse on output pin 9 at the rising edge of each clock cycle. The duration of each one shot output pulse is determined by the resistor network 325 connected to input pins 12 and 13 of the IC 400. In the preferred embodiment, the IC 400 is configured to provide one shot output pulses having durations of approximately 40 microseconds. The oscillator (clock) frequency is determined by the resistor network 327 connected to pin 1 of the IC 400. Jumper connections 328 may be provided as shown to change the resistance value of the network 327 to increase the clock frequency from the nominal 1 KHz value if desired. This feature is advantageously employed to prevent sensing apparatus mounted on adjacent doors from becoming synchronized and causing false detections. The data sheets for the IC 400, which are available from the manufacturer of the circuit, provide the necessary details concerning setup and operation thereof.

The down counter 304 is also preferably provided in the form of an IC such as the MC14526 counter IC manufactured by Motorola. The down counter 304 is configured as illustrated to provide a modulo-eight counter which is initially loaded with a binary coded decimal value equivalent to seven. The clock input pin 6 of the counter IC is connected to the clock output pin 5 of the IC 400 so that the down counter 304 is clocked by each rising edge of the system clock signal. Initially, the counter 304 outputs a binary coded decimal value equal to seven on the output lines 305, 307 and 309. Each clock cycle the counter 304 decrements the output value by one. Each time the output value reaches zero, the counter 304 reloads the output value to seven and begins another countdown cycle.

The synchronous detector select logic 306 of the preferred embodiment comprises an 8-channel analog switch 405 and a comparator 408. The eight channel switch 405 has its eight channel side connected through eight pull up resistors 406 to the +12 volt digital output of the power supply 290. The comparator 408 is configured as an inverter and is connected between the one shot output pin 9 of the IC 400 and the one channel side (pin 3) of the switch 405. The counter output lines 305, 307, and 309 are connected to channel select pins 9, 10, and 11 of the switch 405 respectively. The counter output value on these lines selects which of the eight output lines 315 connected to the 8-channel side of the switch 405 is switched into electrical contact with pin 3 of the switch 405. All of the lines 315 are normally held at +12 volts. Likewise, pin 3 and the output of the comparator 408 are normally connected to the +12 volt digital output of the power supply through a pull up resistor 407. As described in detail below, high values on the lines 315 provide disable signals to the channel select logic 320. In addition, a high value at the output of the comparator 408 disables signal input gates in the approach side and safety side detection logic 338 and 340. Each time the one shot portion of the IC 400 outputs a positivegoing pulse, the comparator 408 inverts the pulse and enables the signal input gates in the approach side and safety side detection logic 338 and 340 for the duration of the pulse. The inverted pulse is simultaneously also conducted through pin 3 of the analog switch 405 to the output line 315 selected by the counter output value on pins 9, 10 and 11 of the switch 405. The enable signal causes the channel select logic 320 to enable the output of one of the detector/amplifier channels corresponding to the selected output line 315 for the duration of the pulse as described below. As the down counter 304 synchronously counts down, the analog switch 405 switches each inverted pulse to each of the eight output lines 315 sequentially so that the output of each detector/amplifier channel is sequentially and synchronously enabled to output detection signals to the approach side or safety side detection logic 338, 340.

The emitter select logic 310 of the preferred embodiment comprises a second 8-channel analog switch 410 and a read only memory (ROM) of the type having open collector outputs. The output lines 317 of the emitter select logic 310 are connected to the eight channel side of the analog switch 410 through series current limiting resistors 412. The one channel side of the switch 410 (pin 3) is connected to the one shot output pin 9 of the IC 400 through a voltage divider comprised of resistors 414 and 416. The channel select pins 9, 10, and 11 of the switch 410 are connected by the counter output lines 309, 307 and 305, respectively, to the outputs of the down counter 304. The counter output value on these lines selects which of the eight output lines 317 is electrically connected with pin 3. The output lines 317 are thus sequentially and synchronously switched into connection with pin 3 with a different line 317 being switched each clock cycle. The uninverted one shot output pulse that occurs on each rising edge of the clock signal is conducted by the switch 410 through pin 3 to the selected output line 317 and to a corresponding input of an emitter 326 to energize it. Thus, the emitters 326 are sequentially and synchronously energized to emit pulses of directed radiant energy by the one shot output pulses of the IC 400 at the same time the corresponding detector/amplifier channel and approach-side and safety-side detection logic are enabled. Since the nominal clock frequency is 1 KHz, each of the eight emitters 326, and thus each of the sensors is pulsed to detect a retroflective person or object at a rate of approximately 125 Hz.

The output lines 317 are also connected in parallel to data pins of the ROM 415. The three low order address pins of the ROM 415 are connected to outputs of the door operator control loic described above and receive therefrom the zone identification code D0–D2 also described above. The ROM 415 is preferably an 8-bit wide ROM with at least eight addressable locations which together define an emitter energization map. The zone identification code D0–D2 addresses each of the eight-bit wide locations sequentially. Each location corresponds to the zone identified by the code D0–D2 and contains the emitter energization pattern described generally above for that zone. Each bit of each location controls whether the emitter 326 having its input connected by the output line 317 to the ROM 415 data pin for that bit is enabled or disabled. A one bit indicates that an emitter is enabled to be energized and a zero bit indicates that the emitter is disabled from being energized. While an emitter map providing the specific detection zone patterns illustrated in FIGS. 8a through 8h is preferred, it is understood that the emitter map may vary for various applications and physical surroundings.

The detector attenuator logic 312 of the preferred embodiment comprises a second ROM 420 identical to the first ROM 415. Four of the data pins of the ROM 420 are connected to the output lines 319 of the detector attenuator logic 312. Each of the output lines 319 are pulled up to a voltage reference of approximately 6.3 volts by a resistor divider network 422. The signals appearing on the output lines 319 are conducted to inputs of four of the receiver buffer amplifiers 332 which are described in detail below to control the detection levels of the detectors 328 associated therewith. The low three order address pins 10, 11, and 12 of the ROM 420 receive the zone identification code D0–D2 from the door operator control logic described above. The zone identification code D0–D2 sequentially addresses each of the eight ROM locations, which together define a detector attenuation map. Each location corresponds to the zone identified by D0–D2 and contains the detector attenuation pattern described generally above for that zone. Each bit of each location controls the detection level of the detector 328 corresponding to the receiver buffer amplifier 332 having an input connected to the ROM 420 data pin for that bit. A one bit corresponds to a high detection level and a zero bit to a low detection level. Although the ROM 420 is capable of storing a detector map covering each of the eight detectors 328, in the preferred embodiment a map controlling only the detection levels of four selected detectors is utilized. The four detector attenuation signals from the map appearing on output lines 319 are designated ATTEN1–ATTEN4. While a detector attenuation map providing the specific detector attenuation patterns illustrated in FIGS. 8a–8h is preferred, it is understood that the detector attenuation map may vary for various applications and physical surroundings.

Figure 11:
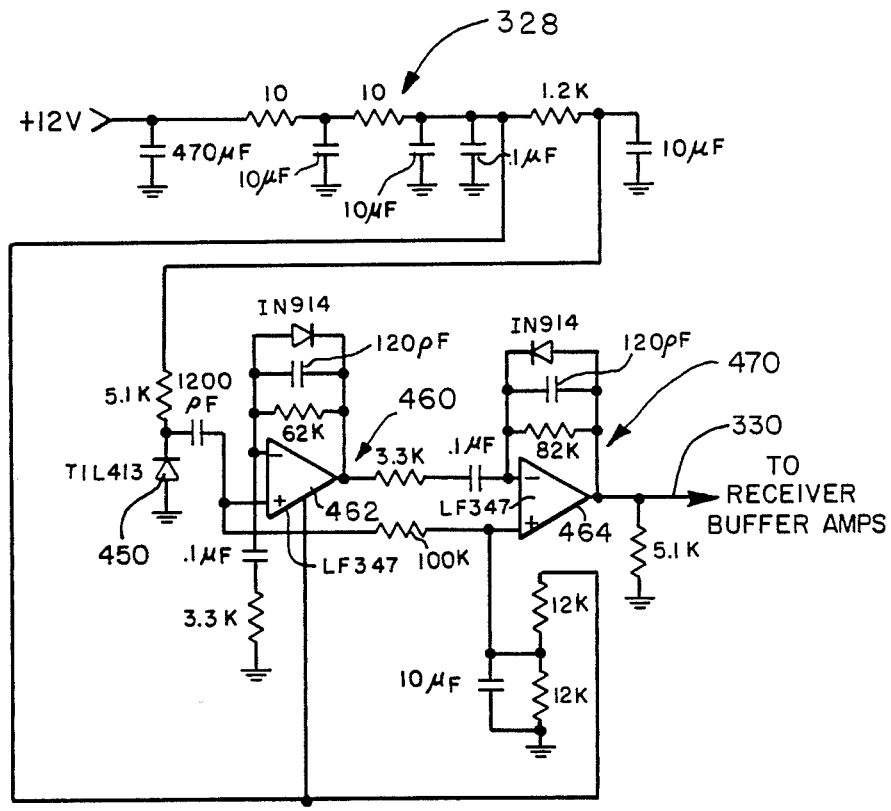
FIG. 11 is a schematic diagram illustrating the details of a preferred detector which is representative of the detectors of FIG. 9.

FIG. 11 is a schematic diagram illustrating the details of a representative preferred detector 328 of the sensing apparatus. As described above, the preferred sensing apparatus includes eight such detectors. Each detector 328 has a photodiode 450 which is rendered conductive by the presence of infrared radiation reflected by a person or retroflective object within a detection zone. Alternatively, other photosensitive devices could be used in place of photodiode 450 including, for example, a phototransistor. However, photodiodes typically have relatively high input impedance and fast rise times and are preferred for that reason. The cathode of the photodiode 450 is capacitively coupled to the noninverting inputs of first and second stage amplifiers 460 and 470 respectively as illustrated. By capacitively coupling the photodiode to the amplifiers 460 and 470, the possibility of signal saturation due to constant high intensity natural or artificial ambient light is avoided. The amplifiers 460 and 470 comprise operational amplifiers 462 and 464 configured as illustrated. Reference voltages for the amplifiers 462 and 464 are derived from the +12 volt analog output of the power supply 290 also as illustrated. The output of the second amplifier 464 is connected by a detector output line 330 to an input of a corresponding receiver buffer amplifier 332 as described above.

The first and second stage amplifiers 460 and 470 are operative to filter the signal appearing at the cathode of the photodiode 450 in order to remove low frequency components due to sources of ambient radiation such as fluorescent lighting. The first and second stage amplifiers 460 and 470 are also biased and operative to provide linear amplification of the photodiode cathode signal. Configured as illustrated, the preferred amplifiers 460 and 470 have filter frequency response sufficient to effectively reject the low frequency signals caused by ambient radiation while leaving the detection pulses appearing at the output of the amplifier 464 due to the reflection of emitter pulses by persons or retroflective objects unaffected. These pulses are conducted to the input of the corresponding receiver buffer amplifier 332.

Figure 12:
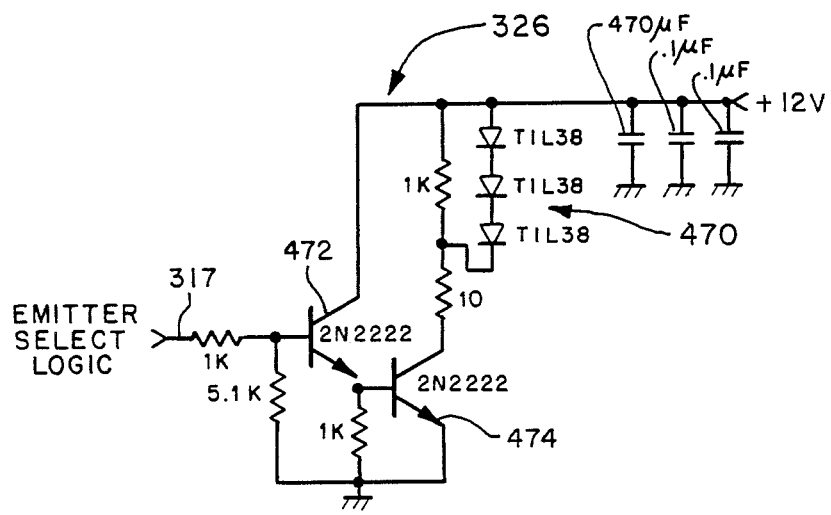
FIG. 12 is a schematic diagram illustrating the details of a preferred emitter which is representative of the emitters of FIG. 9.

FIG. 12 is a schematic diagram illustrating the details of a representative preferred emitter 326 of the sensing apparatus. As described above, the preferred sensing apparatus includes eight such emitters. Each emitter 326 has an input connected to a line 317 from the emitter select logic 310 as described above. The input of the emitter 326 is connected to the base of a first NPN transistor 472 which is configured in a cascaded configuration with a second NPN transistor 474 as shown. Three series LED's 470 are connected between the +12 volt digital output of the power supply 290 and the collector of the second transistor 474 also as shown. The signal on line 317 is normally low. Thus, the transistors 472 and 474 are normally nonconductive and no current flows through the LED's 470. When a positive-going one shot pulse is applied to the input of an enabled emitter 326, the transistors 472 and 474 are triggered into conduction and current flows through the series LED's 470 which in turn emit a beam of radiation to establish a detection zone as described above. When the one shot pulse terminates, the transistors 472 and 474 again become nonconductive and the LED's 470 cease to emit radiation. Three series LED's 470 are preferred in order to generate a detection beam of sufficient intensity. It is understood, however, that more or fewer LED's can be used as desired.

Figure 13:
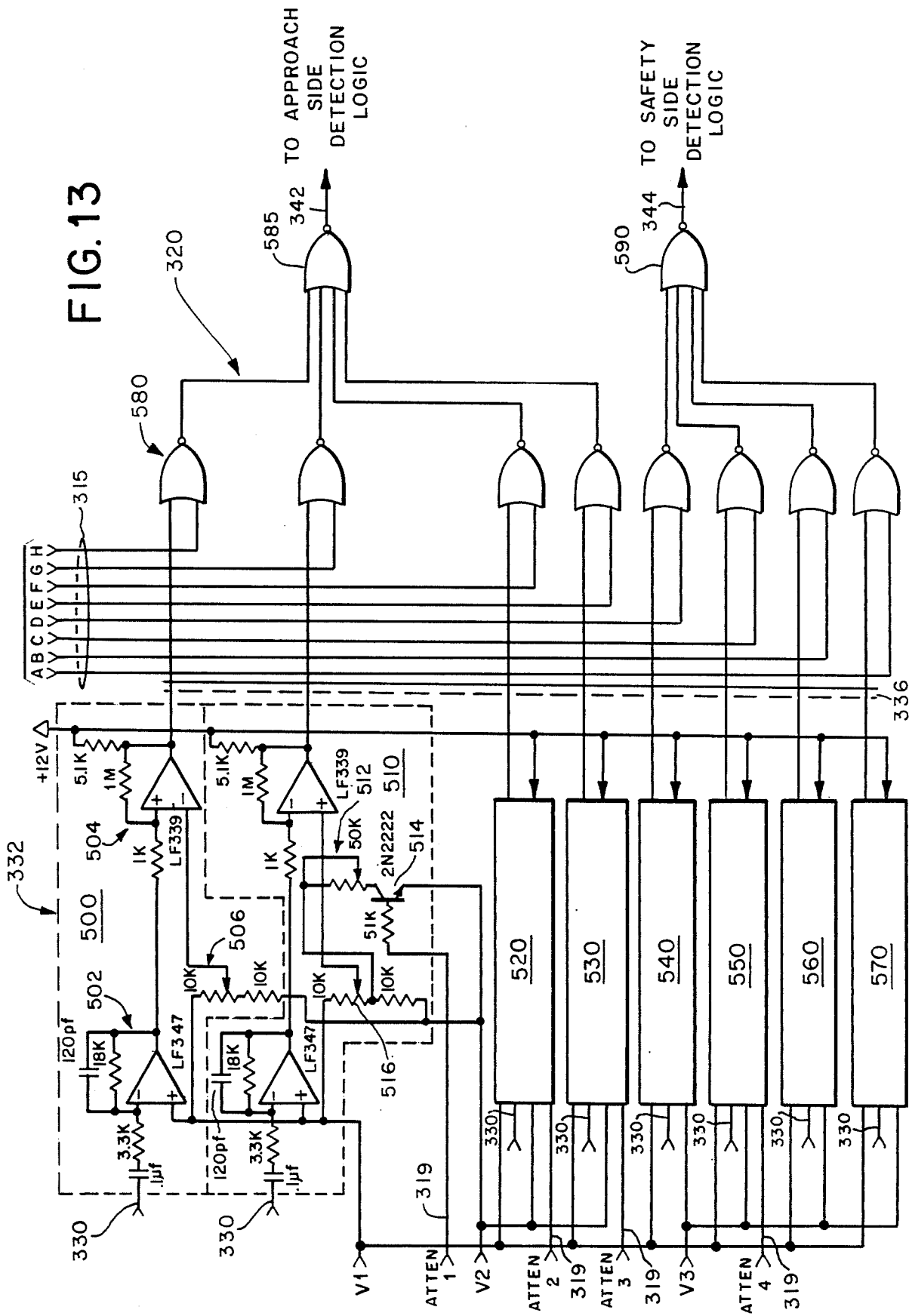
FIG. 13 is a partial schematic and partial block diagram illustrating the details of two preferred receiver buffer amplifiers which are representative of the receiver buffer amplifiers of FIG. 9, and the details of the channel select logic of FIG. 9.

FIG. 13 is a schematic and block diagram illustrating the details of two representative receiver buffer amplifiers 332 and of the channel select logic 320. The eight receiver buffer amplifiers 332 corresponding to the eight detectors 328 of the preferred sensing apparatus are identified as 500, 510, 520, 530, 540, 550, 560, and 570. Four of the receiver buffer amplifiers 500, 510, 520, and 530 are connected to the outputs of the detectors 328 of the approach-side sensors 120, 130, 80, and 60 respectively. The other four receiver buffer amplifiers 540, 550, 560, and 570 are connected to the outputs of the detectors 328 of the safety-side sensors 70, 90, 100, and 110 respectively. The details of representative receiver buffer amplifiers 500 and 510 are illustrated.

The receiver buffer amplifier 500 is representative of receiver buffer amplifiers 540, 560, and 570. The receiver buffer amplifier 510 is representative of receiver buffer amplifiers 520, 530, and 550. The receiver buffer amplifier 500 receives an output signal from its corresponding detector on line 330 as described above. The detector output signal is AC coupled into the inverting input of an amplifier 502, the output of which is coupled to the signal input of a voltage-controlled comparator 504. The output of the comparator 504 is connected by an output line 336 to an input of the channel select logic 320 as described above. Both amplifier 502 and comparator 504 are supplied from the +12 volt analog output of the power supply 290.

Configured as illustrated, the amplifier 502 is operative to provide additional filtering and amplification of the detection signal from the detector. The comparator 504 is operative to compare the filtered, amplified detection signal from the corresponding detector to a pre-determined detection level. If the magnitude of the detection signal exceeds the detection level established by the comparator input differential, the comparator 504 outputs a low detection signal. In the preferred embodiment, the detection level is manually set by adjusting a reference-setting potentiometer 506 which is connected as illustrated. Preferably, the potentiometer is adjusted to provide a detection level such that a typical retroflective object to be detected will be detected at a distance equal to the width of the door 10 plus approximately five inches. The detection levels of the detectors connected to the receiver buffer amplifiers 540, 560, and 570 are similarly set.

Receiver buffer amplifier 510 is essentially the same as receiver buffer amplifier 500 both in terms of structure and operation. The receiver buffer amplifier 510 has a reference-setting potentiometer 516 which corresponds to the reference-setting potentiometer 506 of the receiver buffer amplifier 500. In addition, however, the receiver buffer amplifier 510 has a second attenuation-setting potentiometer 512 and corresponding switching transistor 514 which are connected as illustrated. In the preferred embodiment, the attenuation-setting potentiometer 512 is manually adjusted such that when the switching transistor 514 is in its conducting state, the reference voltage set on the reference input of the voltage-controlled comparator is increased by a desired amount, thereby increasing the detection level, i.e. attenuating the sensitivity, of the detector associated with the receiver buffer amplifier 510. By increasing the detection level associated with the detector, the detection range and sensitivity of the corresponding sensor are thereby reduced. The effect of reducing the range of various sensors is illustrated diagramatically in FIGS. 8a–8h. The reduced range is identified therein as a low detection beam setting. As an alternative to the preferred level detection control arrangement, the output intensity of selected emitters could be selectively reduced.

The switching transistor 514 has its base connected to an output of the detector attenuator logic 312 by one of the lines 319. When a high ATTEN1 signal appears on line 319, the transistor 414 is triggered into conduction thereby allowing current to flow through the attenuation-setting potentiometer 512 to increase the detection level associated with the corresponding detector. When the ATTEN1 signal is low, the switching transistor 514 is non-conductive and the detection level remains at the level set by the potentiometer 516 as described above with respect to receiver buffer amplifier 500. The detection levels of the detectors corresponding to the receiver buffer amplifiers 520, 530, and 550 respectively are set similarly and controlled similarly by the ATTEN2–ATTEN4 signals respectively from the detector attenuator logic 312.

The settings of the detection levels described in the foregoing paragraphs are also adjustable by adjusting voltage V2 in the case of the receiver buffer amplifiers 500, 510, 520, and 530, and voltage V3 in the case of receiver buffer amplifiers 540, 550, 560 and 570. In the preferred embodiment, the reference setting potentiometers 506 and 516 and the attenuation-setting potentiometer 512 are advantageously initially set by the manufacturer of the sensing apparatus rather than by the user thereof to establish standard or uniform detection levels for each of the detectors 328. As described in detail below, the purchaser of the sensing apparatus may subsequently adjust the detection levels for his own situation using the detection level adjust logic 334 to adjust the voltages V2 and V3.

The outputs of the eight receiver buffer amplifiers 332 are conducted by lines 336 to corresponding inputs of the channel select logic 320 as described above. In the preferred embodiment, the channel select logic 320 comprises eight parallel 2-input NOR gates identified collectively as 580, each having one input connected to one of the lines 336 and each having the other input connected to one of the lines 315 connected to the 8-channel side of the analog switch 405 of the synchronous detector select logic 306. The outputs of the four NOR gates 580 having inputs connected to outputs of receiver buffer amplifiers 500, 510, 520, and 530 are connected to inputs of a four input NOR gate 585. The outputs of the four NOR gates 580 having inputs connected to outputs of the receiver buffer amplifiers 540, 550, 560, and 570 are connected to inputs of a second four input NOR gate 590. The output of the NOR gate 585 is connected by the channel select logic output line 342 to an input of the approach side detection logic 338 and the output of the NOR gate 590 is connected by the channel select logic output line 344 to an input of the safety side detection logic 340.

As described above, the lines 315 connected to the 8-channel side of the analog switch 405 are normally pulled up to +12 volts. Accordingly, the outputs of the NOR gates 580 are normally clamped low and the outputs of the NOR gates 585 and 590 are normally clamped high. In this state, the gates are disabled from conducting detection signals from any of the receiver buffer amplifiers 332 to the approach side safety side detection logic 338, 340. Simultaneously with the energization of each emitter, the analog switch 405 switches an inverted one shot output pulse to the output line 315 connected to the input of the NOR gate 580 having its other input connected to the output of the detector/amplifier channel corresponding to the energized emitter. If during the time that the gate 580 is enabled, a person or retroflective object is or becomes present within the directed beam of radiation generated by the energized emitter 326, the gate 580 conducts the resulting detection signal from the corresponding detector/amplifier channel to an input of the NOR gate 585 or 590 depending upon whether the enabled channel corresponds to an approach or safety-side sensor. This signal in turn appears at the output of the NOR gate 585 or NOR gate 590 and is conducted by line 342 or 344 to an input of the approach side or safety side detection logic 338, 340. As each emitter is synchronously and sequentially energized, the analog switch 405 simultaneously switches an enable pulse to the input of the NOR gate for the detector/amplifier channel corresponding to the energized emitter. Thus, the corresponding emitter and detector of each sensor 325 are energized and enabled simultaneously, and the corresponding emitter and detector pairs comprising the sensor 325 are sequentially and synchronously energized to emit directed radiation beams and enabled to detect radiation reflected therefrom by persons or objects present therein.

Figure 14:
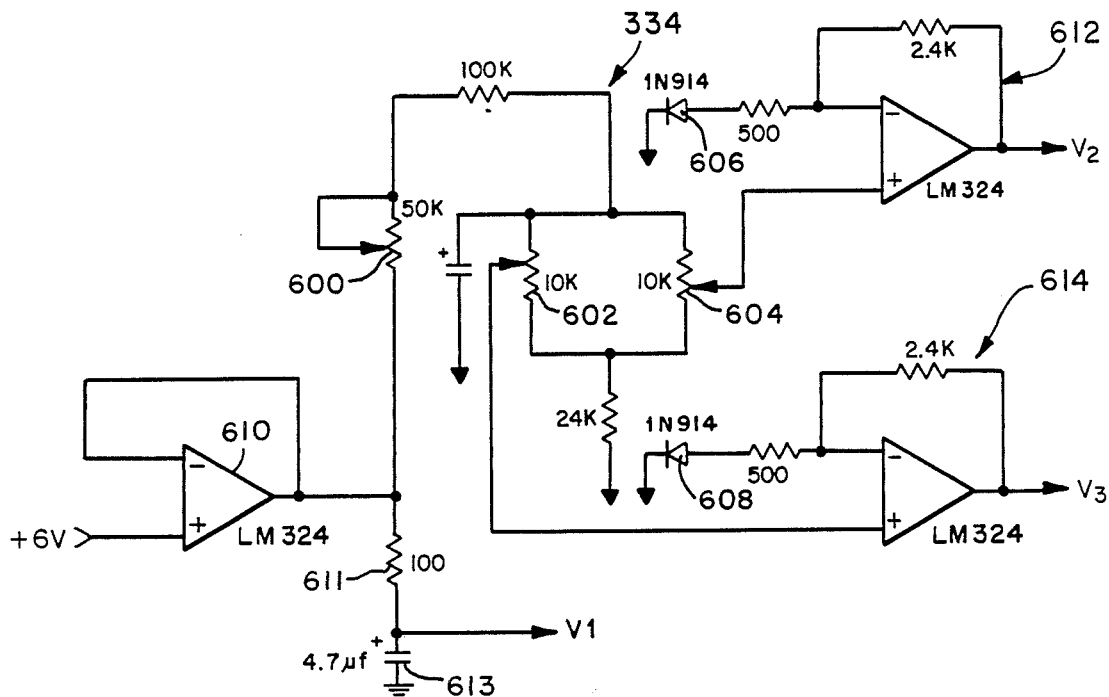
FIG. 14 is a schematic diagram illustrating the details of the detection level adjust logic of FIG. 9.

FIG. 14 is a schematic diagram illustrating the details of the detection level adjust logic 334. The detection level adjust logic 334 has an input that receives a DC reference voltage of one-half Vcc which may be derived from the +12 volt analog output of the power supply by a resistive voltage divider, for example. The amplifier bias voltage V1 and the reference voltages V2 and V3 are derived from the +6 volt reference voltage. An operational amplifier 610 buffers the reference voltage, which in the preferred embodiment is +6 VDC. The output of the amplifier 610 is coupled to ground through a series resistor 611 and capacitor 613. The voltage which appears across the capacitor 613 is the same as the reference voltage and is designated as voltage V1. A linear amplifier 612 and corresponding potentiometer 604 are provided to adjust the value of the reference voltage V2 and a second linear amplifier 614 and potentiometer 602 are provided to adjust the value of the reference voltage V3. In the preferred embodiment, the reference voltages V2 and V3 are initially set to approximately +4 volts at room temperature by adjusting the potentiometers 602 and 604 to maximize the voltage applied to the inputs of comparators 612 and 614 and adjusting a pttentiometer 600 which is connected to the output of the amplifier 610 until V2 and V3 equal approximately +4 volts.

As mentioned above, the settings of the reference voltages V2 and V3 relative to the value of the reference voltage V1 determine the detection levels of the detectors 328 and consequently the ranges of the sensors. By adjusting the settings of the potentiometers 602 and 604, the high and low detection levels of the safety-side and approach-side detectors respectively can be varied. The setting of the potentiometer 600 establishes the maximum adjustment range of the voltages V2 and V3. It is preferred that the potentiometers 602 and 604 be adjusted so that the detectors 328 are capable of detecting the presence of a typical retroflective object at a distance of at least the width of the door on which the sensing apparatus is mounted plus approximately five inches. However, it may be necessary in some surroundings to adjust the potentiometers 602 and 604 so that the range of the detectors 328 is somewhat reduced to avoid the inadvertent detection of clutter such as railings, door jambs, posts, and the like in proximity to the door 10. In order to prevent variations in the range of the detectors 328 due to temperature variations, temperature compensating diodes 606 and 608 are preferably included as illustrated.

Figure 15:
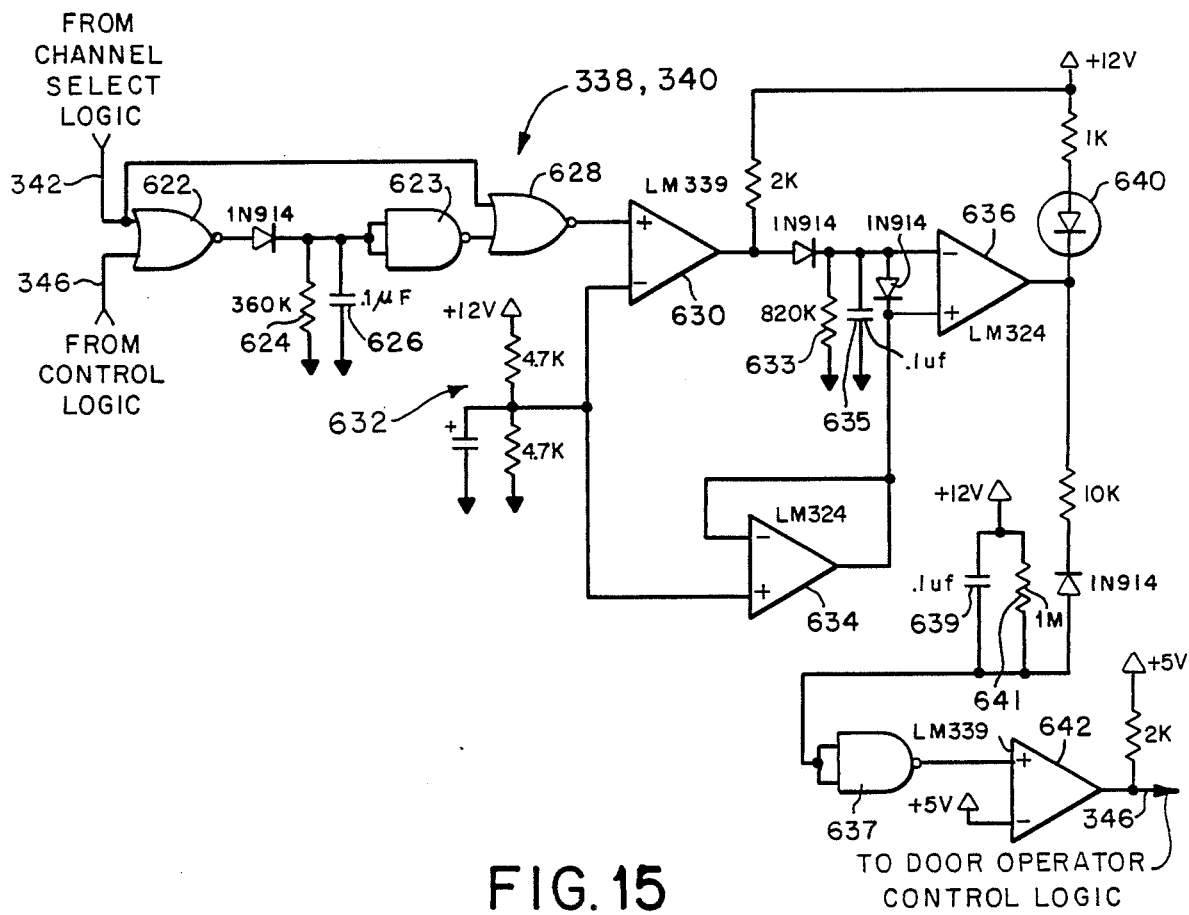
FIG. 15 is a schematic diagram illustrating the details of the approach-side detect logic of FIG. 9 which is identical to the safety-side detect logic of FIG. 9.

FIG. 15 is a schematic diagram illustrating the details of the approach side detection logic 338. The safety-side detection logic 340, which is not illustrated, is identical. NOR gates 622 and 628 have inputs connected to the channel select logic output line 342. NOR gate 622, which functions as a controlled signal input gate, has a second input connected to an output line 346 of the control logic 300 as described above. The output line 346 conducts inverted one shot output pulses to the input of the NOR gate 622 simultaneously with the energization of each emitter to enable the reception of any resulting detection signals from the channel select logic 300. During the time that the gate 622 is enabled, if a logic low detection pulse occurs on the output line 342 indicating a detection by the enabled detector/amplifier channel, the signal is inverted by the NOR gate 622 and integrated by a capacitor 626 which is connected between the output of the NOR gate 622 and ground as illustrated. The values of the capacitor 626 and a parallel resistor 624 are preferably selected as shown to provide an integrator that requires five pulses each having duration of at least approximately 85 percent of the duration of the one shot output pulse to occur during the time period necessary to perform five complete emitter energization cycles in order to charge the capacitor 626 to a level sufficient to change the output of NAND gate 628. This ensures that the capacitor 626 will only be charged by detection signals synchronized with the energization of an emitter and not in response to the detection of spurious matter such as snow or automobile exhaust in the detection zone. It also minimizes the possibility that the capacitor 626 will be charged in response to the erroneous detection of radiation from a detection zone generated by an emitter of another sensor mounted on a nearby door.

If a sufficient number of properly-timed detection pulses occur within the predetermined time period, the capacitor 626 charges to a level which forces the output of a NAND gate 623, which is connected as an inverting latch, low. This in turn enables a NOR gate 628 to invert and couple subsequent detection pulses to the non-inverting input of a comparator 630. The reference input of the comparator 630 receives a +6 volt reference voltage which is derived from +12 volt analog output of the power supply 290 by a voltage divider 632. In the preferred embodiment, the reference voltage divider is common to both the approach side and detection side logic 338 and 340 and is not duplicated. The +6 volt reference voltage is also coupled by an operational amplifier 634 configured as a non-inverting buffer to the non-inverting input of a second comparator 636.

Additional detection pulses occurring after the first five such pulses, cause corresponding pulses to appear at the output of the comparator 630. These pulses are integrated by a capacitor 635 and resistor 633 connected between the output of the comparator 630 and ground. The value of the capacitor 635 and resistor 633 are preferably selected as shown to provide an integrator that requires the occurrence of five detection pulses within the time necessary to complete five cycles of emitter energizations in order to charge the capacitor 635 to a level sufficient to trigger the generation of an output pulse to the door operator control logic. This arrangement provides additional protection against the erroneous detection of spurious objects in the detection zones such as, for example, small objects being blown through the detection zone or birds flying through the detection zone. It is understood, however, that a shorter or longer time period and fewer or greater numbers of pulses may be selected as required for particular applications.

If five pulses are received and integrated by the capacitor 635 within the selected time period, the output of the operational amplifier 636 goes low, signifying a valid detection and pulling the inputs of a NAND gate 637 low, thereby causing the output of the NAND gate to go high. The output of the NAND gate 637 is connected to the signal input of a comparator 642. When the output of the NAND gate 637 goes high, the output of the comparator 642, which is normally low, is also pulled high to the level of the +5 volt output of the power supply 290. The output of the comparator 642 is connected by the output line 346 of the approach side detection logic 338 to an input of the door operator control logic as described above. The TTL logic high level signal on the output line 346 indicates to the door operator control logic that a valid detection of a retroflective object has occurred in the approach-side detection zone. In response, the door operator control logic generates the appropriate control signals for the door operator to control the door 10 as described above.

In order to ensure that the valid detection of a person or retroflective object in the detection for even a very short time produces an output signal of sufficient duration to be detected by the door operator control logic, a parallel capacitor 639 and resistor 641 having a time constant of approximately 200 milliseconds is connected between the +12 volt digital output of the power supply 290 and the input of the NAND gate 637. In addition, an LED 640 is connected between the +12 volt analog output of the power supply and the output of the operational amplifier 636 so that when the output of the amplifier 636 goes low, the LED 640 becomes forward biased and provides a visual indication that a valid detection has occurred. In addition, or as a substitute to the indicator LED 640, an audible indicator such as an electronic bell may also be provided.

Figure 16:
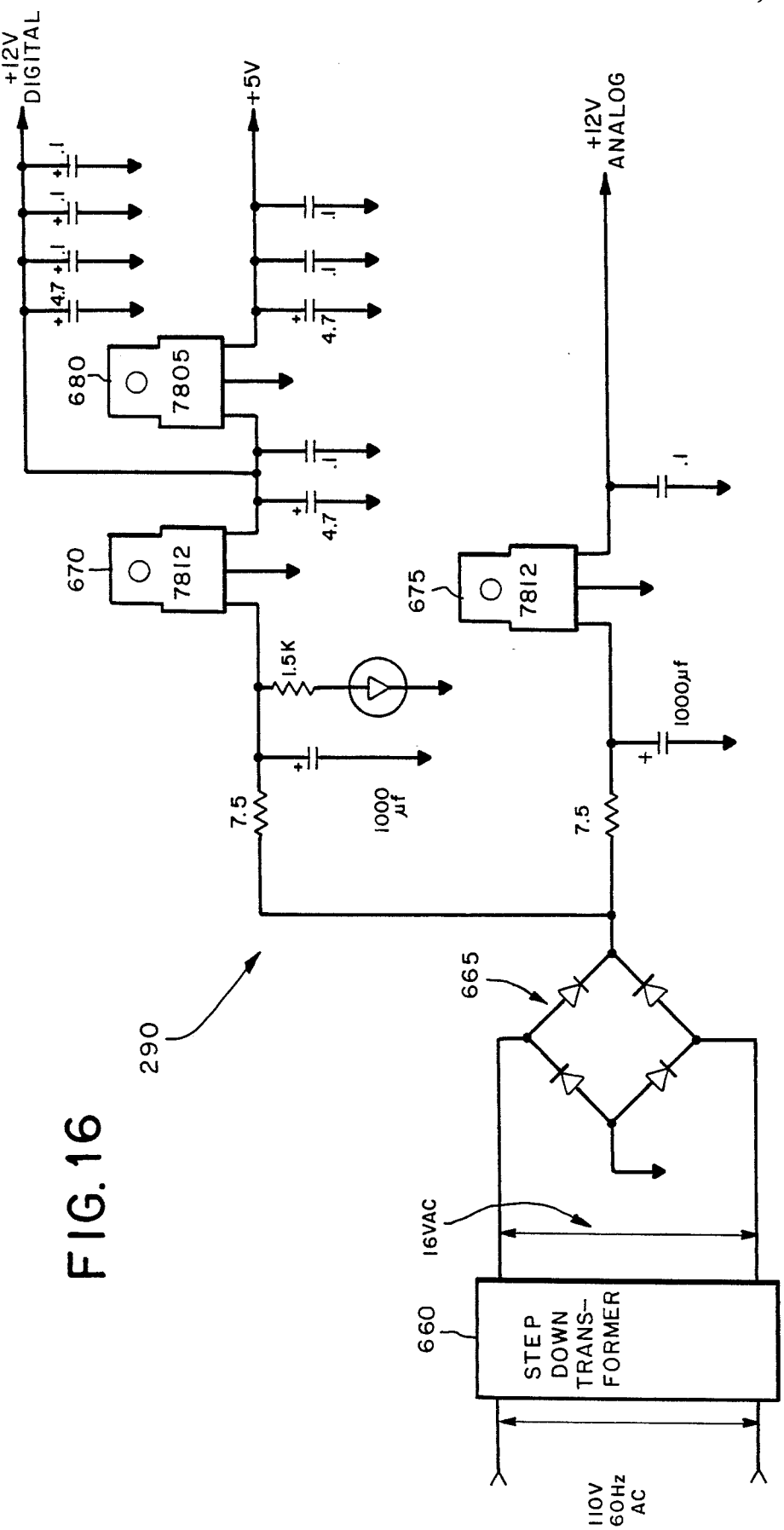
FIG. 16 is a schematic diagram illustrating the details of the power supply of FIG. 9.

FIG. 16 is a schematic diagram illustrating the details of the DC power supply 290. The power supply 290 includes a conventional step down transformer 660 which steps down the 110 volt, 60 Hz. AC power waveform to a 16 volt AC waveform. A conventional diode bridge rectifier 665 is connected across the terminals of the step down transformer and full wave rectifies the 16 volt AC waveform. The output of the rectifier 665 is connected in parallel through conventional filtering resistors and capacitors to inputs of first and second twelve volt regulators 670 and 675 respectively. The output of the first twelve volt regulator 670 comprises a +12 volt digital DC supply voltage which is used to supply the digital components of the preferred sensing apparatus as described and illustrated. The output of the second twelve volt regulator 675 comprises a +12 volt analog DC supply voltage which is utilized to supply various analog components of the preferred sensing apparatus as described and illustrated. The output of the first twelve volt regulator 670 is also connected to the input of a five volt regulator 680. The output of the five volt regulator 680 comprises the +5 volt DC supply voltage which is used to supply reference voltages to the various components as described and illustrated above.

What have been described are certain aspects of a sensing apparatus for use with an automatic door operator and door operator control which constitutes a presently preferred embodiment of the invention. It is understood that the foregoing description and accompanying illustrations are merely exemplary and are not to be taken as limitations in the scope of the invention, which is defined solely by the appended claims and their equivalents. Various changes and modifications to the preferred embodiments will be apparent to those skilled in the art. Such changes and modifications can be made without departing from the spirit and scope of the invention. Accordingly, it is intended that all such changes and modifications be covered by the appended claims and their equivalents.

I claim:

1. Sensing apparatus for use with an automatic door operator responsive to door control signals to effect opening and closing of a swinging door, said door having a frame including a horizontal muntin therein, the sensing apparatus comprising:

means for providing door position signals representative of the instantaneous position of the door;

a plurality of sensor means, comprising:

a plurality of radiant energy emitting means on each side of the door for directing radiant energy in selected sensing zones;

a plurality of detecting means on each side of the door associated with said emitting means and being directed toward said sensing zones, said detecting means being operable to generate detection signals indicative of the presence of retroflective objects in said sensing zones upon detection of radiant energy reflected thereby in excess of a predetermined detection level;

said plurality of sensor means being mounted inside the muntin of the door;

window means recessed in said muntin in locations corresponding to the locations of said sensor means for providing transmission of radiant energy between said sensor means and said sensing zones;

sensor control means being responsive to the door position signals and being operative to control said emitting means and detecting means individually at various positions of the door during opening and closing thereof; and means for generating door control signals in response to said detection signals.

2. The sensing apparatus defined in claim 1 wherein at least one said sensor means is mounted in proximity to each longitudinal end of said muntin on each side of said door.

3. The sensing apparatus defined in claim 1, including:
means for establishing a motion detection zone on one side of said door;
motion detecting means for generating motion detection signals upon sensing the motion of objects within said detection zone; and
said means for generating door control signals being responsive to said motion detection signals.

4. The sensing apparatus defined in claim 1 wherein said sensor control means comprises means responsive to the door position signals for varying said predetermined detection level for each of said detecting means for predetermined door positions.

5. The sensing apparatus defined in claim 1 wherein said window means include infrared filter means.

6. The sensing apparatus defined in claim 1 wherein said emitting and detecting means are removably mounted with said muntin.

7. The sensing apparatus defined in claim 1 wherein said emitting and detecting means of each said sensor means are mounted in said muntin relative to said window means so that said window means is operative to restrict the beam angle of said emitting and detecting means to at least partially define said sensing zones.

8. Door control apparatus for use with an automatic door operator responsive to door control signals to effect opening and closing of a swinging door, comprising:
means for providing door position signals representative of the instantaneous position of the door;
a plurality of radiant energy emitting means mounted on each side of the door for directing radiant energy in selected sensing zones;
a plurality of radiant energy detecting means mounted on each side of the door in association with said emitting means and directed toward said sensing zones, said emitting means being operable to generate voltage detection signals indicative of the presence of retroflective objects in said sensing zones upon detection of radiant energy reflected to said detecting means thereby;
sensor control means responsive to said door position signals to selectively energize said emitter means and enable said associated detecting means to generate said voltage detection signals to indicate the presence of retroflective objects as the door changes position; and
means responsive to said detecting means for accumulating the voltage detection signals from said plurality of detecting means on a side of the door, said accumulating means being operative to generate said door control signal to control operation of the door only when the voltage detection signals accumulated exceed a predetermined value.

9. The door control apparatus defined in claim 8 wherein a plurality of apertures are provided in a muntin of the door and wherein said emitting and detecting means are mounted within said muntin relative to said apertures such that said apertures restrict the beam angles of said emitting and detecting means to at least partially define said sensing zones.

10. The door control apparatus defined in claim 8 wherein said accumulating means further includes:
means for detecting the coincidence of said voltage detection signals with the selective energization of said emitting means; and
means responsive to said means for detecting coincidence to enable operation of said accumulating means for only when the coincidence of said voltage detection signals and corresponding energization of said emitting means exceeds a predetermined value.

* * * * *

UNITED STATES PATENT AND TRADEMARK OFFICE
CERTIFICATE OF CORRECTION

PATENT NO. : 4,851,746
DATED : July 25, 1989
INVENTOR(S) : David D. Milke

It is certified that error appears in the above-identified patent and that said Letters Patent is hereby corrected as shown below:

On the cover page after "4,717,820 1/1985", please delete "Jonnson et al." and substitute therefore --Jonsson et al.--.

On the cover page, please delete "4,868,000" and substitute therefore --3,868,000--.

In column 1, line 35, please delete "wellknown" and substitute therefore --well-known--.

In column 6, line 68, please delete "Like wise" and substitute therefore --Likewise--.

In column 7, line 41, please delete "slides" and substitute therefore --slide--.

In column 7, line 56, after "17" please insert --,--.

In column 7, line 63, please delete "verticallyaligned" and substitute therefor --vertically aligned--.

In column 8, line 12, please delete "wall" and substitute therefore --walls--.

UNITED STATES PATENT AND TRADEMARK OFFICE
CERTIFICATE OF CORRECTION

PATENT NO. : 4,851,746

DATED : July 25, 1989

INVENTOR(S) : David D. Milke

It is certified that error appears in the above-identified patent and that said Letters Patent is hereby corrected as shown below:

In column 9, line 57, please delete "3 bit" and substitute therefor --3-bit--.

In column 10, line 24, please delete "tthe" and substitute therefor --the--.

In column 10, line 37, please delete "lustrated" and substitute therefor --illustrated--.

In column 10, line 55, after "walls" please insert --,--.

In column 12, line 58, please delete "approach side" and "safety side" and substitute therefor --approach-side-- and --safety-side--.

In column 12, line 68, please delete "approach side" and substitute therefor --approach-side--.

In column 13, line 4, please delete "approach side" and "safety side" and substitute therefor --approach-side-- and --safety-side--.

In column 13, line 39, please do not start a new paragraph. This a continuation of the previous paragraph.

In column 14, line 48, please delete "positivegoing" and substitute therefor --positive-going--.

UNITED STATES PATENT AND TRADEMARK OFFICE
CERTIFICATE OF CORRECTION

PATENT NO. : 4,851,746

DATED : July 25, 1989

INVENTOR(S) : David D. Milke

It is certified that error appears in the above-identified patent and that said Letters Patent is hereby corrected as shown below:

In column 15, line 32, please delete "loic" and substitute therefor --logic--.

In column 19, line 15, before "safety" please insert --or--.

In column 19, line 68, please delete "pttentiometer" and substitute therefor --potentiometer--.

In column 21, line 50, after "detection" please insert --zone--.

In claim 1, col. 22, line 64, please start a new paragraph beginning with "sensor".

In claim 6, col. 23, line 24, please delete "with" and substitute therefor --within--.

UNITED STATES PATENT AND TRADEMARK OFFICE
CERTIFICATE OF CORRECTION

PATENT NO.   : 4,851,746
DATED        : July 25, 1989
INVENTOR(S)  : David D. Milke It is certified that error appears in the above-identified patent and that said Letters Patent is hereby corrected as shown below:

In claim 8, col. 24, line 4, please delete "emitting" and substitute therefor --detecting--.

In claim 10, col. 24, line 36, please delete "for".

Signed and Sealed this

Fifteenth Day of September, 1992

Attest:

DOUGLAS B. COMER

*Attesting Officer*   Acting Commissioner of Patents and Trademarks